(12) United States Patent
Johnston et al.

(10) Patent No.: US 12,081,546 B2
(45) Date of Patent: *Sep. 3, 2024

(54) SYSTEM FOR ACCESSING DATA FROM MULTIPLE DEVICES

(71) Applicant: LIBERTY VAULTS LIMITED, London (GB)

(72) Inventors: Christopher Iain Johnston, London (GB); Michel Leduc, Trets (FR)

(73) Assignee: Liberty Vaults Limited, London (GB)

( * ) Notice: Subject to any disclaimer, the term of this patent is extended or adjusted under 35 U.S.C. 154(b) by 287 days.

This patent is subject to a terminal disclaimer.

(21) Appl. No.: 17/144,899

(22) Filed: Jan. 8, 2021

(65) Prior Publication Data

US 2021/0344678 A1 Nov. 4, 2021

Related U.S. Application Data

(62) Division of application No. 14/914,262, filed as application No. PCT/GB2014/052640 on Aug. 29, 2014, now Pat. No. 10,893,045.

(30) Foreign Application Priority Data

Aug. 29, 2013 (GB) ..................... 1315420

(51) Int. Cl.
 *H04L 29/06* (2006.01)
 *G06F 21/32* (2013.01)
 (Continued)

(52) U.S. Cl.
 CPC ............. *H04L 63/10* (2013.01); *G06F 21/32* (2013.01); *G06F 21/34* (2013.01); *G06F 21/40* (2013.01); *G06F 21/73* (2013.01); *H04L 63/123* (2013.01)

(58) Field of Classification Search
 CPC ....... H04L 63/10; H04L 63/123; G06F 21/32; G06F 21/34; G06F 21/40; G06F 21/73
 (Continued)

(56) References Cited

U.S. PATENT DOCUMENTS 5,907,616 A * 5/1999 Brogger ............. G06Q 20/3672
 713/172
6,195,568 B1 2/2001 Irvin
 (Continued)

FOREIGN PATENT DOCUMENTS

| CN | 1352783 | 6/2002 |
| CN | 1352783 A | 6/2002 |

(Continued)

OTHER PUBLICATIONS

Office Action issued in Chinese Application No. 201810059439.X, dated Jul. 3, 2020, 15 pages.
(Continued)

*Primary Examiner* — Badri Narayanan Champakesan
(74) *Attorney, Agent, or Firm* — Eversheds Sutherland (US) LLP

(57) ABSTRACT

A method of accessing data at a device, wherein the data is stored remotely from the device or in removable storage. The method may the following steps: (i) sending a request from the device to access the data, the request including an identification code of a secure element or a memory card associated with the device, (ii) verifying, based at least partly on the identification code, whether access to the data is to be allowed or denied, and (iii) allowing or denying the device access to the data accordingly.

18 Claims, 11 Drawing Sheets

(51) Int. Cl.
*G06F 21/34* (2013.01)
*G06F 21/40* (2013.01)
*G06F 21/73* (2013.01)
*H04L 9/40* (2022.01)

(58) Field of Classification Search
USPC .......................................................... 726/4
See application file for complete search history.

(56) References Cited

U.S. PATENT DOCUMENTS

| | | | | |
|---|---|---|---|---|
| 6,474,544 | B2 * | 11/2002 | Di Giorgio | G06Q 20/06 235/375 |
| 6,961,587 | B1 * | 11/2005 | Vilppula | G06Q 20/341 455/558 |
| 6,968,459 | B1 * | 11/2005 | Morgan | G06F 21/31 713/189 |
| 6,978,156 | B1 | 12/2005 | Papadopoulos et al. | |
| 7,039,808 | B1 * | 5/2006 | Fausse | G06F 21/602 713/170 |
| 7,054,613 | B2 * | 5/2006 | Smeets | H04W 12/1206 455/410 |
| 7,225,341 | B2 * | 5/2007 | Yoshino | G06F 12/1458 711/E12.093 |
| 7,620,814 | B2 * | 11/2009 | Ondet | G06Q 20/02 380/227 |
| 7,624,267 | B2 * | 11/2009 | Huang | H04W 12/0602 713/168 |
| 7,653,200 | B2 * | 1/2010 | Karmi | H04L 12/5692 380/270 |
| 7,710,241 | B2 | 4/2010 | Jung | |
| 7,783,308 | B2 | 8/2010 | Ogren | |
| 7,787,870 | B2 | 8/2010 | Burgan et al. | |
| 7,937,593 | B2 * | 5/2011 | Chen | G06F 21/64 705/67 |
| 8,108,905 | B2 * | 1/2012 | Johns | G06F 21/53 711/163 |
| 8,166,524 | B2 * | 4/2012 | Sentinelli | H04L 63/18 726/5 |
| 8,195,950 | B2 | 6/2012 | Spearman | |
| 8,286,223 | B2 * | 10/2012 | Leibovitz | H04L 63/08 726/16 |
| 8,316,237 | B1 * | 11/2012 | Felsher | H04L 9/0825 380/282 |
| 8,365,262 | B2 * | 1/2013 | Lu | H04L 9/3231 726/6 |
| 8,407,774 | B2 * | 3/2013 | Rodriguez | H04L 63/08 726/7 |
| 8,438,654 | B1 * | 5/2013 | von Eicken | G06F 21/53 709/217 |
| 8,584,221 | B2 * | 11/2013 | Mazur | H04L 9/3226 726/8 |
| 8,588,749 | B1 * | 11/2013 | Sadhvani | H04B 1/38 455/412.2 |
| 8,745,724 | B2 * | 6/2014 | Kothari | H03K 3/037 726/16 |
| 8,756,657 | B2 * | 6/2014 | Bijlsma | H04W 12/06 455/421 |
| 8,850,230 | B2 * | 9/2014 | Schnell | G06F 21/10 713/193 |
| 8,863,256 | B1 | 10/2014 | Addepalli | |
| 8,880,027 | B1 * | 11/2014 | Darringer | G06F 21/35 455/41.1 |
| 8,886,217 | B2 | 11/2014 | Reitter et al. | |
| 8,909,920 | B2 * | 12/2014 | Vignocchi | G06F 21/34 463/43 |
| 8,923,820 | B2 * | 12/2014 | Huang | H04W 12/06 455/411 |
| 8,931,080 | B2 * | 1/2015 | Feraud | G06F 21/34 726/18 |
| 9,008,616 | B2 * | 4/2015 | Wall | G06Q 30/06 455/407 |
| 9,031,539 | B2 * | 5/2015 | Mohajeri | H04W 12/06 455/411 |
| 9,130,919 | B2 * | 9/2015 | Haynes | H04L 63/08 |
| 9,225,696 | B2 * | 12/2015 | Pascariello | G06F 21/6218 |
| 9,240,891 | B2 * | 1/2016 | Popp | G06Q 20/341 |
| 9,241,264 | B2 * | 1/2016 | Korhonen | H04L 63/0884 |
| 9,300,629 | B1 | 3/2016 | Jahr | |
| 9,445,269 | B2 * | 9/2016 | Jiang | H04L 9/321 |
| 2002/0045457 | A1 | 4/2002 | Taniguchi | |
| 2003/0070091 | A1 | 4/2003 | Loveland | |
| 2003/0139192 | A1 | 7/2003 | Chmaytelli et al. | |
| 2004/0162057 | A1 * | 8/2004 | Steininger | H04W 8/18 455/411 |
| 2005/0107114 | A1 | 5/2005 | Ocock | |
| 2005/0114680 | A1 * | 5/2005 | Chinnaswamy | H04W 12/04031 713/185 |
| 2005/0278775 | A1 * | 12/2005 | Ross | H04L 63/20 726/2 |
| 2006/0105809 | A1 | 5/2006 | Luo | |
| 2006/0268800 | A1 | 11/2006 | Sugaya | |
| 2007/0066288 | A1 * | 3/2007 | Soelberg | H04M 3/4931 455/415 |
| 2007/0094715 | A1 | 4/2007 | Brown et al. | |
| 2007/0208743 | A1 * | 9/2007 | Sainaney | G06F 16/9535 |
| 2008/0040282 | A1 * | 2/2008 | Yamamoto | H04N 7/163 705/52 |
| 2008/0081609 | A1 * | 4/2008 | Burgan | H04W 8/18 455/425 |
| 2008/0104393 | A1 * | 5/2008 | Glasser | G06F 21/6245 713/165 |
| 2008/0114987 | A1 * | 5/2008 | Morris | H04L 63/0815 713/183 |
| 2008/0152098 | A1 | 6/2008 | Paryzek et al. | |
| 2008/0274725 | A1 | 11/2008 | Tkachenko | |
| 2009/0070694 | A1 | 3/2009 | Ore | |
| 2009/0183010 | A1 | 7/2009 | Scnell et al. | |
| 2009/0303019 | A1 * | 12/2009 | Trappeniers | G06F 21/34 340/10.41 |
| 2009/0325562 | A1 | 12/2009 | Hough et al. | |
| 2010/0048169 | A1 * | 2/2010 | Yan | G06F 21/62 455/411 |
| 2010/0299745 | A1 | 11/2010 | Karppien et al. | |
| 2010/0323664 | A1 | 12/2010 | Sivaram et al. | |
| 2011/0028124 | A1 | 2/2011 | Sprague et al. | |
| 2011/0053574 | A1 | 3/2011 | Rice | |
| 2011/0078762 | A1 | 3/2011 | Bijlsma | |
| 2011/0099616 | A1 | 4/2011 | Mazur et al. | |
| 2011/0150968 | A1 | 6/2011 | Grassi | |
| 2011/0265149 | A1 | 10/2011 | Ganesan | |
| 2012/0054845 | A1 | 3/2012 | Rodriguez et al. | |
| 2012/0117381 | A1 * | 5/2012 | Lo | G06F 21/575 713/156 |
| 2012/0203737 | A1 | 8/2012 | Golos | |
| 2012/0027887 | A1 | 11/2012 | Wang | |
| 2013/0179676 | A1 | 7/2013 | Hamid | |
| 2013/0212653 | A1 | 8/2013 | Hoghaug | |
| 2013/0263233 | A1 | 10/2013 | Dinha | |
| 2013/0263242 | A1 * | 10/2013 | Jain | G06F 21/34 726/9 |
| 2013/0303112 | A1 | 11/2013 | Chhipa | |
| 2014/0096215 | A1 | 4/2014 | Hessler | |
| 2014/0171024 | A1 | 6/2014 | Huang et al. | |
| 2014/0187200 | A1 * | 7/2014 | Reitter | H04W 4/30 455/410 |
| 2014/0188738 | A1 | 7/2014 | Huxham | |
| 2014/0273949 | A1 | 9/2014 | Duggan | |
| 2015/0288671 | A1 | 10/2015 | Chan | |
| 2015/0289134 | A1 | 10/2015 | Johnston | |

FOREIGN PATENT DOCUMENTS

| | | |
|---|---|---|
| CN | 1177300 C | 11/2004 |
| CN | 1177900 C | 12/2004 |
| CN | 1950809 | 4/2007 |
| CN | 1950809 A | 4/2007 |
| CN | 101448340 A | 6/2009 |

(56) References Cited

FOREIGN PATENT DOCUMENTS

| | | |
|---|---|---|
| CN | 101599129 | 12/2009 |
| CN | 101599129 A | 12/2009 |
| CN | 102122365 A | 7/2011 |
| CN | 102193744 | 9/2011 |
| CN | 102193744 A | 9/2011 |
| CN | 102203790 | 9/2011 |
| CN | 102203790 A | 9/2011 |
| CN | 102761870 A | 10/2012 |
| DE | 19828735 A1 | 12/1999 |
| EP | 681408 A | 11/1995 |
| EP | 681408 A1 | 11/1995 |
| EP | 1033048 A1 | 9/2000 |
| EP | 1467275 A1 | 10/2004 |
| EP | 2192015 A1 | 6/2010 |
| FR | 2719436 A1 | 11/1995 |
| GB | 2408179 A | 5/2005 |
| GB | 2454792 | 5/2009 |
| GB | 2454792 A | 5/2009 |
| JP | H10117229 A | 5/1998 |
| JP | 2009017239 A | 1/2009 |
| JP | 2009088917 A | 4/2009 |
| JP | 2012/073902 A | 4/2012 |
| KR | 1020120087644 A | 8/2012 |
| KR | 20130085472 A1 | 7/2013 |
| WO | 9219078 A1 | 10/1992 |
| WO | 0001179 A1 | 1/2000 |
| WO | 0217353 A2 | 2/2002 |
| WO | 03005687 A2 | 1/2003 |
| WO | 2003005687 A2 | 10/2003 |
| WO | 2006002794 A1 | 1/2006 |
| WO | 2006002794 A2 | 1/2006 |
| WO | 2007130123 A1 | 11/2007 |
| WO | 2008042531 A1 | 4/2008 |
| WO | 2009098534 A1 | 8/2009 |
| WO | 2011025807 A1 | 3/2011 |
| WO | 2011073712 A1 | 6/2011 |
| WO | 2011150968 A1 | 12/2011 |
| WO | 2013/101894 A | 7/2013 |
| WO | 2013124689 A2 | 8/2013 |

OTHER PUBLICATIONS

Office Action issued in Chinese Application No. 201380021102, dated Jul. 5, 2016, 21 pages.
Search and Examination Report issued in British Application No. 1203175, dated Feb. 24, 2014, 8 pages.
First Office Action, CN 201380021102, dated Jul. 5, 2016 (21 pp.).
Combined Search and Examination Report for GB 1203175, dated Feb. 24, 2014 (8 pp.).
Office Action, CN 201810059439.X, dated Jul. 3, 2020, (15 pp.).
PCT, "International Search Report & Written Opinion" App. No. PCT/GB2014/052640, mailed Nov. 25, 2014; (18 pp.).
KIPO "Notice of Preliminary Rejection" App. No. 10-2021-7031145, mailed Jan. 21, 2022 (14 pp.).

* cited by examiner

SYSTEM FOR ACCESSING DATA FROM MULTIPLE DEVICES

CROSS-REFERENCE TO RELATED APPLICATIONS

This application is a divisional of U.S. application Ser. No. 14/914,262, filed Feb. 25, 2016 (and issued as U.S. Pat. No. 10,893,045), which is a national stage entry under 35 U.S.C. § 371 of international patent application no. PCT/GB2014/052640, filed Aug. 29, 2014, the contents of which are hereby incorporated by reference.

The present invention relates to the field of data access. More specifically, it relates to a system for accessing data from multiple devices.

It is known in the art to provide a user with cloud-based data storage. This cloud-based storage may be accessed from multiple devices.

For example, Dropbox™ is a system which provides users with cloud-based remote storage for their data. The data may comprise photographs taken with a mobile telephone, for example. Once the data has been uploaded from the mobile telephone, for example, to the remote storage, it may then be accessed from other devices which are connected to the Internet, such as a laptop or desktop computer. The stored data is encrypted with 256-bit AES encryption and a user must enter their registered e-mail address and password via a website before access to their data is granted.

However, one problem with this system is that if a user's email address and password is discovered by a third party then that third party may also access the stored data from any device. Thus, there is a need for a more secure remote storage system which may be accessed from one or multiple devices.

According to a first aspect of the invention, there is provided a method of accessing data at a device, wherein the data is stored remotely from the device or in removable storage, the method comprising the following steps: (i) sending a request from the device to access the data, the request including an identification code of a secure element or memory card associated with the device; (ii) verifying, based at least partly on the identification code, whether access to the data is to be allowed or denied; and (iii) allowing or denying the device access to the data accordingly.

Access to the data is thus only allowed if a correct identification code associated with the device is provided. Thus, it is possible to prevent unauthorised devices from accessing the data since they will not be able to provide a correct identification code.

As stated above, the request includes an identification code of a secure element or memory card associated with the device. However, the identification code may be included in the request in a modified form, for example, in an encrypted form and/or combined with one or more further codes, data or information.

The data to be accessed includes any form of data which can be stored in memory. For example, it may comprise one or more data files, databases, applications, software, and/or services. Some examples of services are discussed below.

Preferably, the identification code is sent via a secure channel. Alternatively or additionally, the identification code may be encrypted. This can make the process more secure and help to prevent the identification code being intercepted and/or discovered by a third party.

A further (additional or alternative) possibility would be to generate a code at the device based on the identification code of the secure element or memory card and one or more other elements or codes from the device. This generated code could then be sent and may, for example, only be valid for a particular session. Thus, even if it were intercepted it would be of no use to a third party.

The data may be stored in a removable storage device, the cloud or other forms of remote data storage. For example, the data could be stored in a USB key, a laptop, a computer server (personal or corporate), a computer network (personal or corporate), a tablet or telephone.

The request may also include a passcode or PIN entered at the device and step (ii) may also comprise verifying based on the passcode or PIN whether access to the data is to be allowed or denied. Thus, two-factor authentication may be required in order to access the data.

The passcode or PIN may be (first) verified by the secure element or memory card associated with the device (e.g. a SIM or a virtual SIM).

Alternatively (or additionally), the passcode or PIN may be verified remotely from the device, for example at an access controller which is arranged to control access to the data.

In the case that the passcode or PIN is verified by the secure element or memory card, the result of this verification is preferably transferred to, for example, an access controller in a secure and/or protected manner, e.g. via a secure channel. For example, the result could be transferred in the form of a certificate, an encrypted code, a session code or an encrypted session code. Preferably, the result of the verification is only transferred if the verification was successful, i.e. if the correct passcode or PIN were entered.

In the case that the passcode or PIN is verified remotely from the device, for example at an access controller, it is preferred that the passcode or PIN is transferred, e.g. to the access controller, in a secure and/or protected manner. For example, the passcode or PIN could be transferred via a secure channel and/or by encrypting the passcode or PIN before transfer.

Alternatively or additionally, the request may include data representing something inherent to a user of the device, and step (ii) may also comprise verifying based on the data representing something inherent to the user of the device whether access to the data is to be allowed or denied. Thus, two- or three-factor authentication may be required in order to access the data and only authorised users may be granted access to the data.

The data representing something inherent to the user of the device may comprise data representing genetic and/or biometric information about the user such as a fingerprint or iris data, for example.

Alternatively or additionally to authentication using a PIN and/or data representing something inherent to a user of the device (two- or three-factor authentication with the identification code), the following forms of authentication are possible.

The request may include data including a location (i.e. the place where the user is attempting to access the data from), and step (ii) may also comprise verifying based on the location whether access to the data is to be allowed or denied.

The request may include data including a time (i.e. the time at which the user is attempting to access the data), and step (ii) may also comprise verifying based on the time whether access to the data is to be allowed or denied.

The request may include data indicating that the user is part of a group, and step (ii) may also comprise verifying whether access to the data is to be allowed or denied based on whether another member of the group (for example, an administrator) is accessing the data.

The secure element or memory card is, for example, a "smart object" or a secure or tamper-proof hardware device with a unique identification code, which itself is also ideally secure and tamper-proof. The secure element or memory card could, for example, be a SIM, a virtual SIM, SIM software, TPM (Trusted Platform Module), SE (secure element), TEE (trusted execution environment), Micro SD, Memory card, USB key or Smartcard.

As mentioned above, one common example of a secure element is a SIM card. SIM cards are provided in all GSM mobile devices and in smartphones. However, SIM cards are provided by the telephone network and so are not easily accessible (in the sense that it is not easy to download applets to the SIM, or to modify the SIM). Furthermore, the operating system of the device may not have the software toolkit to interface with the SIM. To overcome the foregoing disadvantages, it is possible to download a virtual SIM (a software SIM) which can be loaded on the device as an application. The virtual SIM behaves like a physical SIM, meaning that it can receive and process applets, and securely store applets, credentials, keys and algorithms, etc.

The secure element or memory card may be any local, remote or removable form of memory.

The identification code of the secure element or memory card is preferably well-protected and stored, for example, in a safe box in the secure element or memory card.

In preferred embodiments of the invention, the secure element or memory card is used to create a secure channel and/or to encrypt the identification code and/or the PIN or passcode.

The data may be stored in a partition, e.g. a memory partition, associated with the device, and the request may comprise data specifying the partition, e.g. the partition to be accessed.

A secure channel may be created between the secure element or memory card and the partition, and can then be used to transfer data, files, credentials or other form filing data between the device and the partition.

Thus, the method may comprise the steps of: (iv) executing a mutual authentication process between the device and the remote or removable storage; (v) creating a secure channel between the device and the remote or removable storage.

The authentication may comprise two or more factors, the factors being chosen from the following list:
  an identification code of a smart object (a memory card or secure element) associated with the device;
  a passcode or PIN;
  genetic or biometric identification data;
  a location;
  a time; or
  whether another member (e.g. an administrator) or a group which the user belongs to is accessing the data.

The device may read a code from a NFC (near field communication) tag, biometric sensor/reader or signal emitting device to identify and access the partition. The NFC tag, biometric sensor/reader or signal emitting device may provide to the device information necessary to select a partition (which otherwise would need to be input by the user) and eventually to open it.

The signal emitting device may be a Bluetooth, BLE (Bluetooth Low energy), wifi, zigbee, NFC, GPS, or ISO14443 device, or a device making use of any other form of contactless communication.

The partition may store data for facilitating connection to a third party web-based or cloud-based service (for example, internet banking provided by a bank, or parcel tracking, provided by a logistics company).

The data specifying the partition could comprise one or more of: a PIN or passcode; and data representing something inherent to the user of the device. The data representing something inherent to the user of the device could comprise data representing genetic and/or biometric information about the user, for example.

The device may be or comprise a telephone (mobile or fixed), a smartphone, a tablet, a laptop computer, a desktop computer, a TV, a set top box, a camera, a car, a games consol, glasses, a watch, Chromecast, a smart meter (e.g. for measuring electricity, gas or water consumption at a building), jewellery, a travel card, a bank cards, an ATM machine, clothing, sports equipment, an E-reader, binoculars, an MP3 player, a hand-held gaming consol, a vehicle such as a plane, a train, a bike, a boat or a bus, an EPO, a kitchen appliance, a mirror, a handbag, a wallet, a hat, a pram, a Hi-fi or other music player or radio, or any other device which is, or has means associated with it which is, capable of sending and receiving data to remote or removable devices.

The device, or preferably the secure element or memory card, preferably has data access software code installed on it for accessing the data. Preferably, in order to install the data access software code, the device must register with the system for example by submitting information related to at least an identification code of the secure element or memory card.

The method preferably comprises, prior to steps (i)-(iii): registering an identification code of a secure element or memory card, or a code or certificate based on this, with the data.

Identification codes of more than one secure element or memory card may be associated with the data. Thus, it can be possible for more than one device to be registered with the data and access the data securely.

A master device may register or request the registration of the identification codes associated with further devices, for example.

As discussed above, the identification codes are preferably an identification codes associated with smart object of the devices. The smart object may be a SIM, a virtual SIM, SIM software, TPM (Trusted Platform Module), SE (secure element), TEE (trusted execution environment), Micro SD, Memory card, USB or Smartcard associated with the device, for example. Different smart objects could be used to provide the identification codes for different devices. The smart object may be any local, remote or removable form of memory.

In some cases, a device may only be allowed to access the data if at least one further device is also accessing the data. In some cases, the at least one further device may have to be a particular specified device, such as an administrator device.

According to a further aspect, there is provided a method of controlling access to data from a device, wherein the data is stored remotely from the device or in removable storage, the method comprising the following steps: (I) receiving a request from the device to access the data, the request including an identification code of a secure element or memory card associated with the device; (ii) verifying, based at least partly on the identification code, whether access to the data is to be allowed or denied; and (iii) allowing or denying the device access to the data accordingly.

This aspect may comprise any of the additional or optional features of the first aspect described above.

Preferably, the method of this aspect is performed by a data access controller. The data access controller may be remote from the device which wishes to access the data. For example, the data access controller may be in the cloud.

According to a further aspect, there is provided a data access controller for controlling access to data stored remotely from a device or in removable storage, the data access controller being arranged to perform the following steps: (i) receive a request from the device to access the data, the request including an identification code of a secure element or memory card associated with the device; (ii) verify, based at least partly on the identification code, whether access to the data is to be allowed or denied; and (iii) allow or deny the device access to the data accordingly.

The data access controller may be remote from the device which wishes to access the data. For example, the data access controller may be in the cloud.

The data to be accessed may be data for facilitating access to a cloud-based or web-based third party service. All of the following aspects of the invention (along with the preferred or optional features thereof) may also comprise this optional feature.

The request to access the data may be received by a cloud-based partition. Where applicable, the following aspects of the invention (along with the preferred or optional features thereof) may also comprise this optional feature.

According to a further aspect, there is provided a system comprising a device and a data access controller for controlling access from the device to data stored remotely from the device or in removable storage, wherein the device is arranged to send a request to access the data to the data access controller, the request including an identification code of a secure element or memory card associated with the device; and the data access controller is arranged to verify, based at least partly on the identification code, whether access to the data is to be allowed or denied, and to allow or deny the device access to the data accordingly.

According to a further aspect, there is provided a computer program for controlling access to data stored remotely from a device or in removable storage, the program being configured to perform the following steps when executed by a processor: (i) receive a request from the device to access the data, the request including an identification code of a secure element or memory card associated with the device; (ii) verify, based at least partly on the identification code, whether access to the data is to be allowed or denied; and (iii) allow or deny the device access to the data accordingly.

According to a further aspect, there is provided a method of registering a device with an access controller such that the device may access data via the access controller, the data being stored remotely from a device or in removable storage, wherein the method comprises: sending a request to register a device for access to data, the request including an identification code of a secure element or memory card associated with the device; checking whether access to the data is to be allowed; and if access is to be allowed, registering the identification code against the data to be accessed.

The request preferably includes a two or three factor code based on, for example, the identification code of a secure element or memory card associated with the device and one or more of a PIN or passcode, and data representing something inherent to the user. This allows for an auditable trail of which devices have requested access to a partition.

The request may be in the form of an email or SMS.

The method preferably further comprises sending information related to the request to an administrator device, wherein the administrator device preferably decides whether or not access to the data is to be granted. The information related to the request may be sent from an access controller or the device which is seeking registration, for example. The administrator device may be used to set access permissions for the device requesting access, such as read only or the ability to edit/delete/add additional content to the data.

For example, in the case where the secure element or memory card of a child's device (e.g. a phone or tablet) is registered such that it can access a parent's data, the secure element or memory card of a parent's device (e.g. a phone or tablet) could be registered as the administrator for that data so that it can monitor and control the child's access to the data. The data itself could actually be stored in the parent's administrator device. Thus, a device (or multiple devices) may (each) allow one or more further devices to access data stored in that device but with limited or specified read/right permission, for example.

Preferably, if the administrator decides to allow the device to have access to the data, a signal is sent from the administrator to the access controller indicating this.

According to a further aspect, there is provided a method of registering a device with an access controller such that the device may access data via the access controller, the data being stored remotely from a device or in removable storage, wherein the method comprises: receiving a request to register a device for access to data, the request including an identification code of a secure element or memory card associated with the device; checking whether access to the data is to be allowed; and if access is to be allowed, registering the identification code against the data to be accessed.

According to a further aspect, there is provided a data access controller for controlling registration of devices with access to data, the controller being arranged to perform the following steps: receive a request to register a device for access to data, the request including an identification code of a secure element or memory card associated with the device; check whether access to the data is to be allowed; and if access is to be allowed, register the identification code against the data to be accessed.

According to a further aspect there is provided a system comprising a device and a data access controller for controlling registration of devices with access to data, the controller being arranged to perform the following steps: receive from the device a request to register the device for access to data, the request including an identification code of a secure element or memory card associated with the device; check whether access to the data is to be allowed; and if access is to be allowed, register the identification code against the data to be accessed. The system preferably further comprises an administrator device.

The data access controller is preferably arranged to send a signal to the administrator device to check whether access to the data is to be allowed for the device to be registered.

The administrator device is preferably arranged to send a signal confirming whether access to the data is to be allowed for the device to be registered and/or setting access permissions for the device requesting access, such as read only or the ability to edit/delete/add additional content to the data.

According to a further aspect, there is provided a computer program for controlling registration of devices with access to data, the program being configured to perform the following steps when executed by a processor: receive from the device a request to register the device for access to data, the request including an identification code of a secure element or memory card associated with the device; check whether access to the data is to be allowed; and if access is to be allowed, register the identification code against the data to be accessed.

According to a further aspect, there is provided a method of accessing data at a device, wherein the data is stored remotely from the device or in removable storage, the method comprising: receiving at the device an invitation to access the data, the invitation comprising a password, code or PIN; sending a request from the device to access the data, the request including the password, code or PIN; verifying, based at least partly on the password, code or PIN, whether access to the data is to be allowed or denied; and allowing or denying the device access to the data accordingly.

Thus, it is possible for a user to send invitations to further devices (his own or those or another user) so that further devices may also access data. These devices (or an identification code associated therewith) need not necessarily be registered with the data in order to be granted access.

According to this aspect, access may be granted to the device for an unlimited time or for a predetermined length or time. In either case, access may be prevented, for example by another user, at some point after access has been granted.

The password, code or PIN may be generated by a random number generator, for example.

The password, code or PIN is preferably a one-time-password. This can provide a secure method of granting access to further users.

Preferably, the password, code or PIN is only valid for a specified period of time. Thus, if it is not used within the specified period, access will not be granted based on that password, code or PIN. The period may be up to 1, 2, 3, 4, 5, 6, 7, 8, 9, 10, 15, 20, 25, 30, 45, 60, 90 or 120 minutes, for example. The period is preferably 24 hours or less. On the other hand, in some embodiments, the password, code or PIN may not have a particular expiry time.

Preferably, the password, code or PIN, at least, is sent to and/or from (preferably to and from) the device via a secure channel.

In some embodiments, the password, code or PIN is generated by a device controlling access to the data, such as a master device. Alternatively, the master device may grant this same functionality to a non-master device.

The method may be a method of a first device allowing a second device to access data, wherein the data is stored remotely from the first and second devices, the invitation being sent from the first device to the second device, the request to access the data being sent from the second device and access to the data is allowed or denied to the second device.

In this case, the password, code or PIN may be generated in the first device.

Alternatively, the password, code or PIN may be generated remotely from both the first and second devices, for example at a processor controlling access to the data.

In either case, the method preferably further comprises registering the generated password, code or PIN with the data to be accessed.

The step of registering the generated password, code or PIN with the data to be accessed may comprise verifying that the first device is allowed to invite further devices to access the data before registering the generated password, code or PIN.

The method may further comprise sending a request from the first device for the password, code or PIN to be generated, wherein the password, code or PIN to be generated is only generated after it has been verified that the first device is allowed to invite further devices to access the data.

Thus, in either case, only authorised devices may invite further devices to access the data.

The step of verifying that the first device is allowed to invite further devices to access the data preferably comprises verifying an identification code associated with the device, such as an identification code of a secure element or memory card associated with the device as described above.

The step of verifying that the first device is allowed to invite further devices to access the data further may comprise verifying data specifying the partition sent from the first device.

The data specifying the partition preferably comprises one or more of: —a PIN or passcode; and—data representing something inherent to the user of the device such as genetic and/or biometric information.

According to a further aspect, there is provided a method of allowing access to data at a device, wherein the data is stored remotely from the device or in removable storage, the method comprising: sending to the device an invitation to access the data, the invitation comprising a password, code or PIN; sending a request from the device to access the data, the request including the password, code or PIN; verifying, based at least partly on the password, code or PIN, whether access to the data is to be allowed or denied; and allowing or denying the device access to the data accordingly.

The invitation may be sent from an administrator device, preferably via an access controller. The invitation may be in the form a message such as an email or SMS message and/or it could be sent and viewable via a messaging system within a data access application. When the invited user opens or logs into this application, they may see that an invitation has been received to access certain data. The user may then access the data.

The invitation may include a OTP (one-time-password), for example a OTP which the user may enter in a web browser in order to access the data via the web browser (e.g. as opposed to via the data access application)

According to a further aspect, there is provided a system comprising a first device, a second device and a data access controller, the first device being arranged to allow access to data at the second device, wherein the data is stored remotely from the second device or in removable storage, wherein the first device is arranged to send to the second device an invitation to access the data, the invitation comprising a password, code or PIN; the second device is arranged to send a request to access the data, the request including the password, code or PIN; and the data access controller is arranged to verify, based at least partly on the password, code or PIN, whether access to the data is to be allowed or denied, and to allow or deny the second device access to the data accordingly.

According to a further aspect, there is provided a method of accessing data at a device, wherein the data is stored remotely from the device or in removable storage, the method comprising the following steps: (i) sending a request from the device to access the data, the request including data related to the request; (ii) verifying, based at least partly on the data, whether access to the data is to be allowed or denied; and (iii) allowing the device access to the data accordingly and only if there is at least one further device accessing the data.

Such a method can provide a secure environment in which certain actions, such as financial transactions, messaging and/or viewing (e.g. confidential) data, may be performed only when a further device is present. The further device (e.g. an administrator device) could then monitor any actions performed by the device. Prompt action, such as blocking or preventing further access to the data could then be taken, if appropriate.

The method preferably comprises, prior to step (iii), checking whether at least one further device is accessing the data. The at least one further device may be a particular specified device, such as a "master" device, for example.

According to a further aspect, there is provided a method of controlling access to data at a device, wherein the data is stored remotely from the device or in removable storage, the method comprising the following steps: (i) receiving a request from the device to access the data, the request including data related to the request; (ii) verifying, based at least partly on the data, whether access to the data is to be allowed or denied; and (iii) allowing the device access to the data accordingly and only if there is at least one further device accessing the data.

According to a further aspect, there is provided a data access controller for controlling access to data at a device, wherein the data is stored remotely from the device or in removable storage, the data access controller being arranged to perform the following steps: (i) receive a request from the device to access the data, the request including data related to the request; (ii) verify, based at least partly on the data, whether access to the data is to be allowed or denied; and (iii) allow the device access to the data accordingly and only if there is at least one further device accessing the data.

The data access controller is also preferably arranged to check whether at least one further device is accessing the data prior to performing step (iii).

According to a further aspect, there is provided a system comprising a device and a data access for controlling access to data at a device, wherein the data is stored remotely from the device or in removable storage, the data access controller being arranged to perform the following steps: (i) receive a request from the device to access the data, the request including data related to the request; (ii) verify, based at least partly on the data, whether access to the data is to be allowed or denied; and (iii) allow the device access to the data accordingly and only if there is at least one further device accessing the data.

Preferably, the device is arranged to send the request to access the data to the data access controller.

The data access controller is also preferably arranged to check whether at least one further device is accessing the data prior to performing step (iii).

According to a further aspect, there is provided a computer program for controlling access to data stored remotely from a device or in removable storage, the program being configured to perform the following steps when executed by a processor: (i) receive a request from the device to access the data, the request including data related to the request; (ii) verify, based at least partly on the data, whether access to the data is to be allowed or denied; and (iii) allow the device access to the data accordingly and only if there is at least one further device accessing the data.

The program is also preferably configured to check whether at least one further device is accessing the data prior to performing step (iii).

A further aspect of the invention relates to a method of accessing data at a device, wherein the data is stored remotely from the device, in removable storage or in the device itself, the method comprising the following steps: (i) sending a request to access the data, the request including an identification code associated with the device and one or more of: a PIN or passcode; and data representing something inherent to the user of the device such as genetic and/or biometric information; (ii) verifying, based on the identification code, and the PIN or passcode and/or data representing something inherent to the user, whether access to the data is to be allowed or denied; and (iii) allowing or denying the device access to the data accordingly.

The data is preferably stored in a partition. In this case, the PIN or passcode, and/or the data representing something inherent to the user of the device such as genetic and/or biometric information, is associated with the partition which the user is seeking to access. For example, the PIN or passcode, and/or the data representing something inherent to the user of the device such as genetic and/or biometric information may identify the data or partition where the data is stored.

In the case of genetic and/or biometric information, one option could be that finger prints from different fingers are associated with different data or partitions so that, depending on which finger print is entered and sent, the corresponding data or partition is accessed.

A further aspect of the invention relates to a method of controlling access to data at a device, wherein the data is stored remotely from the device, in removable storage or in the device itself, the method comprising the following steps: (i) receiving a request to access the data, the request including an identification code associated with the device and one or more of: a PIN or passcode; and data representing something inherent to the user of the device such as genetic and/or biometric information; (ii) verifying, based on the identification code, and the PIN or passcode and/or data representing something inherent to the user, whether access to the data is to be allowed or denied; and (iii) allowing or denying the device access to the data accordingly.

A further aspect of the invention relates to a data access controller for controlling access to data at a device, wherein the data is stored remotely from the device, in removable storage or in the device itself, the data access controller being arranged to perform the following steps: (i) receive a request to access the data, the request including an identification code associated with the device and one or more of: a PIN or passcode; and data representing something inherent to the user of the device such as genetic and/or biometric information; (ii) verify, based on the identification code, and the PIN or passcode and/or data representing something inherent to the user, whether access to the data is to be allowed or denied; and (iii) allow or deny the device access to the data accordingly.

A further aspect of the invention relates to a computer program for controlling access to data at a device, wherein the data is stored remotely from the device, in removable storage or in the device itself, the program being configured to perform the following steps when executed by a processor: (i) receive a request to access the data, the request including an identification code associated with the device and one or more of: a PIN or passcode; and data representing something inherent to the user of the device such as genetic and/or biometric information; (ii) verify, based on the identification code, and the PIN or passcode and/or data representing something inherent to the user, whether access to the data is to be allowed or denied; and (iii) allow or deny the device access to the data accordingly.

Aspects of the invention may comprise any of the features, including preferred or optional features, of any of the other aspects of the invention.

In any aspect, the data is preferably encrypted. Preferably, the data is decrypted by the device accessing the data. In this case, the device preferably has a key for decrypting the data.

The key is preferably stored in a secure element or memory card but may be stored remotely. Preferably the key itself is encrypted. The key is preferably transferred to the device in a secure manner, for example by a TSM (trusted service manager).

From the above, it can be appreciated the embodiments of the invention may provide methods and systems in which:

multiple devices can have partition access users can share securely with other users (devices) whilst maintaining control and audit trails transactions can be performed securely.

Multiple devices may access the same remote partition.

Upon accessing data or a partition(s), the device may be able to access one or more of the following services: messaging, media, TV, films, radio, magazines, social media, E-commerce, smart devices (e.g. utilities and home control), corporate services, pictures, photos and video sharing, government services, financial services, medical services, travel services, music and games. Of course, there may also be further services not mentioned here, which could also or alternatively be accessed.

The devices may be able to offer a two or three factor authentication in order to access the partitions. The devices may be secured with one factor of the authentication being an identification code of smart object (a memory card or secure element) and a further factor or factors being a passcode or PIN, or some form of genetic or biometric identification data, or a location, or a time, or whether another member (e.g. an administrator) or a group which the user belongs to is accessing the data.

The following table lists example devices from which a user may wish to access a partition and their possible corresponding "smart objects" (i.e. secure element or memory card). The smart object is the object of the device whose identification code is associated with a partition and which must be verified in order to access to the partition to be allowed.

| Device | Smart object |
| --- | --- |
| Telephone | SIM, virtual SIM, SIM software, SE, TEE, Micro SD, Memory card, NFC smart object (for a NFC smartphone) |
| Tablet | SIM, SE, TEE, Micro SD, Memory card |
| Laptop | SIM, virtual SIM, SIM software, SE, TEE, TPM, Micro SD, Memory card, USB key, Smartcard |
| Desktop | SIM, virtual SIM, SIM software, SE, TEE, Micro SD, Memory card, USB key, Smartcard |
| TV | SIM, virtual SIM, SIM software, SE, TEE, Micro SD, Memory card, USB key, Smartcard |
| Set Top Box | SIM, virtual SIM, SIM software, SE, TEE, Micro SD, Memory card, USB key, Smartcard |
| Camera | SIM, virtual SIM, SIM software, SE, TEE, Micro SD, Memory card, USB key, Smartcard |
| Car | SIM, virtual SIM, SIM software, SE, TEE, Micro SD, Memory card, USB key, Smartcard |
| Games Consol | SIM, virtual SIM, SIM software, SE, TEE, Micro SD, Memory card, USB key, Smartcard |
| Glasses | SIM, virtual SIM, SIM software, SE, TEE, Micro SD, Memory card, USB key, Smartcard |
| Watch | SIM, virtual SIM, SIM software, SE, TEE, Micro SD, Memory card, USB key, Smartcard |
| Chromecast | SIM, virtual SIM, SIM software, SE, TEE, Micro SD, Memory card, USB key, Smartcard |
| Smart meter (home utilities) | SIM, virtual SIM, SIM software, SE, TEE, Micro SD, Memory card, USB key, Smartcard |

Different types of partition may be provided such as:

closed partitions to which only the user has access to closed partitions which can be shared with other users by invitation only open partitions which have audited history trails open and anonymous partitions which have no history or audit trails of users Any kind of partition may be toggled to be open or closed based on criteria such as time slots. For example, a partition could be set to be open at a particular predefined time and closed at a particular predefined time.

Users may register multiple devices against partitions and may toggle, edit and upload functionality against the additional devices they register. For example, a user may wish their camera to have the ability to upload pictures to a partition and view pictures within partitions but not have the ability to delete or edit any content within the partition.

A user may elect to make one or multiple devices as the administrator device(s) of a partition. This could allow the administrator to control access to the partitions and stop access if they deem it necessary. The user could also, in an administrator capacity, have access to all other users' devices that have been granted access to the partitions for which the user is administrator. This could allow the user, in real time, to edit or remove access permissions to the partitions. It could also allow the user to bar access to devices if he loses or no longer owns a device.

The administrator device may have the ability to create a preferably time sensitive code which may be user toggled and which may give him access to log onto a machine which is not connected to a registered smart object. This code could be any length and/or could be inputted into an interface which is connected to access controller and access to partitions could be allowed on non-registered devices such as desktops or laptops. The user could have the ability to halt this session at any point from the administrator device, for example by initiating a halt button on the administrator device. The code which is created is preferably as a result of a two or three factor authentication with the administrator device.

The smart objects may manage multiple partitions which may have the same or different passcodes/authenticators attached to them. Within partitions the system may allow the user to sign up to or automatically sign up to many different third party services. Within the partitions the system may turn the user ID and password set by the user into an alphanumeric string for both password and user ID. This could be passed to the third party service provider. These codes may be renewed based on best practice guidelines for the service. For example they could be renewed every 60 days if the user is accessing medical records in the UK in line with NHS Information Governance requirements.

Thus, according to a further aspect of the invention, there is provided a method of accessing a cloud-based or web-based third party service using a device, the method comprising the following steps: (i) sending a request from the device to a cloud-based partition associated with the device, the partition including data for facilitating connection to the third party service, the request including an identification code of a secure element or memory card associated with the device; (ii) verifying, based at least partly on the identification code, whether access to the partition is to be allowed or denied; (iii) allowing or denying the device access to the partition accordingly; and, after access to the partition is allowed: (iv) transmitting credentials to the third party service.

According to a further aspect of the invention, there is provided a method of controlling access to a cloud-based or web-based third party service by a device, the method comprising the following steps: (i) receiving a request from the device to a cloud-based partition associated with the device, the partition including data for facilitating connection to the third party service, the request including an identification code of a secure element or memory card associated with the device; (ii) verifying, based at least partly on the identification code, whether access to the partition is to be allowed or denied; (iii) allowing or denying the device access to the partition accordingly; and, after access to the partition is allowed: (iv) transmitting credentials to the third party service.

Access to the third party services is thus only allowed if a correct identification code associated with the device is provided. Thus, it is possible to prevent unauthorised devices from accessing the third party services since they will not be able to provide a correct identification code.

The following preferred features apply equally to the foregoing two aspects of the present invention.

In order that the device can access a particular partition, the device may have installed on it appropriate software (e.g. an application) for accessing the partition. This is, for example, stored in the secure element or memory card associated with the device.

Alternatively, the application may be only partly stored in the secure element or memory card; for example, the application could be composed of a standard mobile application and of an applet inside the secure element.

The partition may be associated with a number of different web services.

If it is verified, based at least partly on the identification code, that access to the partition is to be allowed, a mutual authentication process may be launched between the secure element or memory card of the device and the cloud partition. This process allows the creation of a secure channel between the secure element or memory card of the device and the cloud partition. Data may then be transferred between the secure element or memory card of the device and the cloud partition. The data may be encrypted.

Thus, the step of (iv) of transmitting the credentials includes the steps of: performing a mutual authentication process between the secure element or memory card of the device and the partition; and creating a secure channel between the secure element or memory card and the partition. The step may also include transmitting the credentials through the secure channel to the partition. The credentials may be encrypted, in which case the credentials are encrypted prior to transmission through the secure channel. The credentials may then be provided by the partition to the third party services.

Alternatively, the credentials may be stored in a secure element of the partition. In that case, there is no need to transmit credentials from the secure element or memory card to the partition. Instead, the credentials may be transmitted directly from the partition to the third party service when the access to the partition has been granted to the device.

The credentials may be transmitted to the third party service in encrypted form. In that case, a compatible secure element is implemented at the level of the web service to allow de-encryption of the transmitted encrypted credentials.

The secure element or memory card is, for example, a "smart object" or a secure or tamper-proof hardware device with a unique identification code, which itself is also ideally secure and tamper-proof. The secure element or memory card could, for example, be a SIM, virtual SIM, SIM software, TPM (Trusted Platform Module), SE (secure element), TEE (trusted execution environment), Micro SD, Memory card, USB key or Smartcard.

Thus, secure element is a generic term for various types of secure chips, devices or software solutions capable of securely storing and/or processing data (for example, keys, algorithms, applets, credentials).

The secure element or memory card may be any local, remote or removable form of memory.

The identification code of the secure element or memory card is preferably well-protected and stored, for example, in a safe box in the secure element or memory card. Preferably, the identification code is sent via a secure channel. Alternatively or additionally, the identification code may be encrypted. This can make the process more secure and helps to prevent the identification code being intercepted and/or discovered by a third party.

As stated above, the request includes an identification code of a secure element or memory card associated with the device. However, the identification code may be included in the request in a modified form, for example, in an encrypted form and/or combined with one or more further codes, data or information.

The request may also include a passcode or PIN entered at the device and step (ii) may also comprise verifying based on the passcode or PIN whether access to the data is to be allowed or denied. Thus, two-factor authentication may be required in order to access the data.

The passcode or PIN may be (first) verified by the secure element or memory card associated with the device (for example, a SIM, or virtual SIM).

Alternatively or additionally, the request may include data representing something inherent to a user of the device, and step (ii) may also comprise verifying based on the data representing something inherent to the user of the device whether access to the data is to be allowed or denied. Thus, two- or three-factor authentication may be required in order to access the data and only authorised users may be granted access to the data.

The data representing something inherent to the user of the device may comprise data representing genetic and/or biometric information about the user, such as a fingerprint or iris data, for example.

Alternatively or additionally to authentication a PIN and/or data representing something inherent to a user of the device (two-o or three-factor authentication with the identification code), the following forms of authentication are possible.

The request may include data including a location (i.e. the place where the user is attempting to access the data from), and step (ii) may also comprise verifying based on the location whether access to the data is to be allowed or denied.

The request may include data including a time (i.e. the time at which the user is attempting to access the data), and step (ii) may also comprise verifying based on the time whether access to the data is to be allowed or denied.

The request may include data indicating that the user is part of a group, and step (ii) may also comprise verifying whether access to the data is to be allowed or denied based on whether another member of the group (for example, an administrator) is accessing the data.

In preferred embodiments of the invention, the secure element or memory card is used to execute a mutual authentication process, and/or to create a secure channel and/or to encrypt the identification code and/or the PIN or passcode.

The method may include a user enrolment process, whereby the user enrols for use of the third party service. Such a user enrolment process may include the steps of: collecting credentials for accessing the third party service and/or form-filling data requested by the third party service; and securely storing the credentials and/or form-filling data. The credentials may include a user ID and/or a password. Additionally, the credentials may include any information about the user necessary to enrol for the third party service (including, for example, payment details). For example, the credentials may include one or more of the following pieces of information: name, surname, title, address, age, date of birth, sex, loyalty status, loyalty card number, payment card number, type of card, date of expiration, CVV code, ID card or passport number. These pieces of information may also be referred to as form-filling data.

Instead of the credentials being collected in a user enrolment process, the credentials may be automatically generated by the partition after access to the partition is allowed. That is, the enrolment process is managed by the device in combination with the third party service, without the active intervention of the user. In such a case, the user enrolment process may comprise the steps of: initializing the mutual authentication process; and selecting the third party service. That is, the user may not need to provide their credentials to access the third party service; it may be sufficient that the correct identification code (and preferably passcode/PIN, in embodiments which also require a passcode/PIN) is provided in order to access the partition.

The credentials and/or form-filling data may be securely stored on the partition. Alternatively, the credentials and/or form-filling data may be securely stored on the secure element or memory card. In this latter case, the credentials may be supplied when necessary to the partition from the secure element or memory card.

In embodiments in which the credentials (such as a user ID and/or password) are automatically generated, the automatically generated credentials may be renewed periodically or on demand. The period between renewal of the credentials may be adapted according to a user security policy or to a third party service security policy. The automatically generated credentials may be different from credentials used when accessing the services by other means (for example, standard web access from a PC, tablet, or smartphone etc. using a web browser, i.e. without using a specific application). The sophistication and/or complexity of the automatically generated credentials may be adapted according to a user security policy or to a third party service security policy. For example, the minimum length of the password may be set in accordance with the user security policy or the third party service security policy. The user ID and or password may also be required to comprise a mix of two or more of: lowercase letters, uppercase letters, punctuation marks or symbols, and numbers.

A single applet may be installed on the secure element or memory card of the device, the single applet being configured to drive the access to all authentication process and services. However, some types of services may require the ability to manage their own security, and so to control the authentication process and access to their services, independently of any other applet installed on the secure element or memory card. Bank services are one example. Thus, alternatively, a plurality of applets may be stored on the secure element or memory card of the device. Each applet may perform a separate authentication process before generating the credentials to access third-party services related to a given applet.

As well as the step of authentication between the secure element or memory card of the device and the partition, the method may comprise the step of carrying out a second authentication process between the secure element or memory card of the device and a secure element of the third party service. This may be the case where the third party service requires additional security, such that the third party service requires control over the authentication process. The third party service may be a bank, for example.

Thus, the step (iv) of transmitting the credentials may include the steps of: performing a mutual authentication process between the secure element or memory card of the device and a secure element of the third party service; creating a secure channel between the secure element or memory card of the device and the secure element of the third party service; encrypting the credentials; and transmitting the encrypted credentials through the secure channel to the secure element of third party service.

The third party service may request a passcode/PIN to access third party services, and the passcode/PIN is preferably transmitted through the secure channel created between the secure element or memory card and the secure element of the third party service.

Preferably, credentials to access third party services and/or form filling data requested by third party services are automatically provided from the secure element or memory card to the third party partition through the secure channel and then to the third party services when requested following successful completion of the second authentication process.

The third party services may be automatically launched following successful completion of the second authentication process.

The device may act as a master device, allowing a further device (for example, a PC or tablet) to also access the third party service. In such a case, an access code may be generated and displayed on the device (or may be sent to the user by SMS or email, for example), and may be input by the user into a website associated with the third party service, using the further device. The access code may preferably be generated by the application running on the device.

Alternatively, the master device may grant this same functionality (of generation an access code for another device) to a non-master device.

The access code may be time-sensitive, i.e. valid for a certain period of time only. The period may be up to 1, 5, 10, 15, 20, 25, 30, 45, 60, 90 or 120 minutes, for example.

The master device may be used to create new credentials or to update credentials to access the third party service. When the further device is connected to the partition (and consequently also to the web services which are associated with the partition) the credentials may be synchronized between the connected devices (i.e. the device and the further device). Alternatively or additionally, the partition content may be synchronized between the connected devices. For example when new credentials, new services, or new contents are available from the device, they become instantaneously available to the further device as soon as the further device is connected and has successfully passed the authentication process.

The device may read a code from a NFC (near field communication) tag to access the partition and to launch the third party service from the partition. The NFC tag may provide to the device information necessary to select a partition (which otherwise would need to be input by the user) and eventually to open it.

Alternatively, the device may read a code from a biometric sensor/reader to access the partition and to launch the third party service from the partition. The biometric sensor/reader may provide to the device information necessary to select a partition (which otherwise would need to be input by the user) and eventually to open it.

In another embodiment, the device may receive a code from a signal emitting device which may provide to the device information necessary to select a partition (which otherwise would need to be input by the user) and eventually to open it. The signal emitting device may be a Bluetooth, BLE (Bluetooth Low energy), wifi, zigbee, NFC, GPS, or ISO14443 device, or a device making use of any other form of contactless communication.

Each partition may store a unique identifier for a telephony or messaging service. The telephony or messaging service may be a mobile phone telephony service, a VOIP service, or an instant messaging service, for example. The unique identifier may be linked to a telephony or messaging service identifier, such as a user name and password or a telephone number (national or international).

There may be a plurality of partitions, with one unique identifier per partition. As an example, one user may have ten partitions, each associated with a unique identifier, each linked to a different telephone number.

The mapping between the unique identifier and the telephony or messaging service identifier may be stored in the secure element or memory card of the device. Alternatively, the mapping may be stored in the cloud. Alternatively, a Mobile Network Operator may facilitate the mapping of the unique identifier to the telephony or messaging service identifier.

As the identifier is stored on the partition, as long as the user is able to access the partition from a device, the user is able to access the telephony or messaging service (regardless of which device they are using to access the partition). The user would therefore have the ability to send or receive any voice, text or data messages which are associated with that telephony or messaging service, regardless of the device in use.

A particular telephony or messaging service identifier and associated telephony or messaging service may be activated depending on the user's location. This may be the case where the user's location is part of the two- or three-factor authentication process. For example, when connecting to the partition through a home wi-fi network, a home telephone number may be activated on the device. Similarly, if a connection is made via a GPS or 4G base station in another country, a local telephone number within that territory may be activated on the device. For example, if a user travels to France, a French telephone number may be generated for their use. On leaving France, the user may be given the option to retain the number, or release it for use by another user.

Another possible application is where an employee is given a mobile telephone by their employer for work use. The employee may not wish to carry both their personal and work telephone. Instead, the employee may generate a partition (associated with the work telephone) with a unique identifier linked to their personal telephone number. The employee may then make and receive calls using the work mobile telephone, without using the employer's telephone contract.

The invention also extends to a computer program for controlling access to a cloud-based or web-based third party service by a device, the program being configured to perform the method of the above aspects (and/or the preferred features of the methods, as set out above).

Every aspect of the invention may comprise any of the features, including preferred or optional features, of any of the other aspects of the invention.

Thus, the invention also extends to data access controllers, methods of registering a device with a data access controller, systems comprising a device and an access controller, computer programs for controlling registration of devices, methods of accessing data at a device, methods of allowing access to data at a device, systems comprising a first device, a second device and a data access controller as defined in the all of the foregoing aspects of the invention (and the preferred features thereof), wherein the data to be accessed is a cloud-based or web-based third party service and/or the request to access the data is sent to and/or received by a cloud-based partition.

The preferred features of the latter two aspects related to access to cloud-based or web-based third party services may also be taken in combination with the data access controllers, systems comprising a device and an access controller, computer programs for controlling registration of devices, methods of accessing data at a device, methods of allowing access to data at a device, systems comprising a first device, a second device and a data access controller as defined in the all of the foregoing aspects of the invention (and the preferred features thereof).

Partitions may also be subject to multiple smart object locks. For example, a partition may only be opened when two or more different users are logged into the partition. This is particularly relevant when it comes to the sharing of documents in a corporate landscape or undertaking confidential meetings. The use of multiple smart object to open a partition could also be used to secure the identity of a third party when allowing services such as transaction with third party vendor or more informal transactions such as peer to peer transactions needing a secure environment.

Many of the foregoing aspects make reference to verifying, based on an identification code of a secure element or memory card associated with the device, whether access to the data is to be allowed or denied (or similar steps).

These aspects may be able to offer a two (or more) factor authentication in order to access the partitions (where accessing includes creating, editing or deleting the partition). One factor of the authentication may be an identification code of a smart object (a memory card or secure element) associated with the device, and a further factor or factors may be a passcode or PIN, or some form of genetic or biometric identification data, or a location, or a time, or whether another member (e.g. an administrator) or a group which the user belongs to is accessing the data.

In aspects corresponding to those discussed above, it is not necessary that one of the factors is an identification code of a memory card or secure element associated with the device.

Thus, in a further aspect of the invention, there is provided a method of accessing a partition from a device comprising the steps of: performing a mutual authentication between the partition and the device; and creating a secure channel between the partition and the device, wherein the authentication comprises two or more factors, the factors being chosen from the following list: an identification code of a smart object (a memory card or secure element) associated with the device; a passcode or PIN; some form of genetic or biometric identification data; a location; a time; or whether another member (e.g. an administrator) or a group which the user belongs to is accessing the data. Preferably, the term "accessing" includes creating, editing, or deleting the partition.

The factors included in this list are discussed in greater detail in the description above, with reference to earlier aspects of the invention.

Preferred embodiments of the invention will now be described by way of example only and with reference to the figures, in which.

Figure 1:
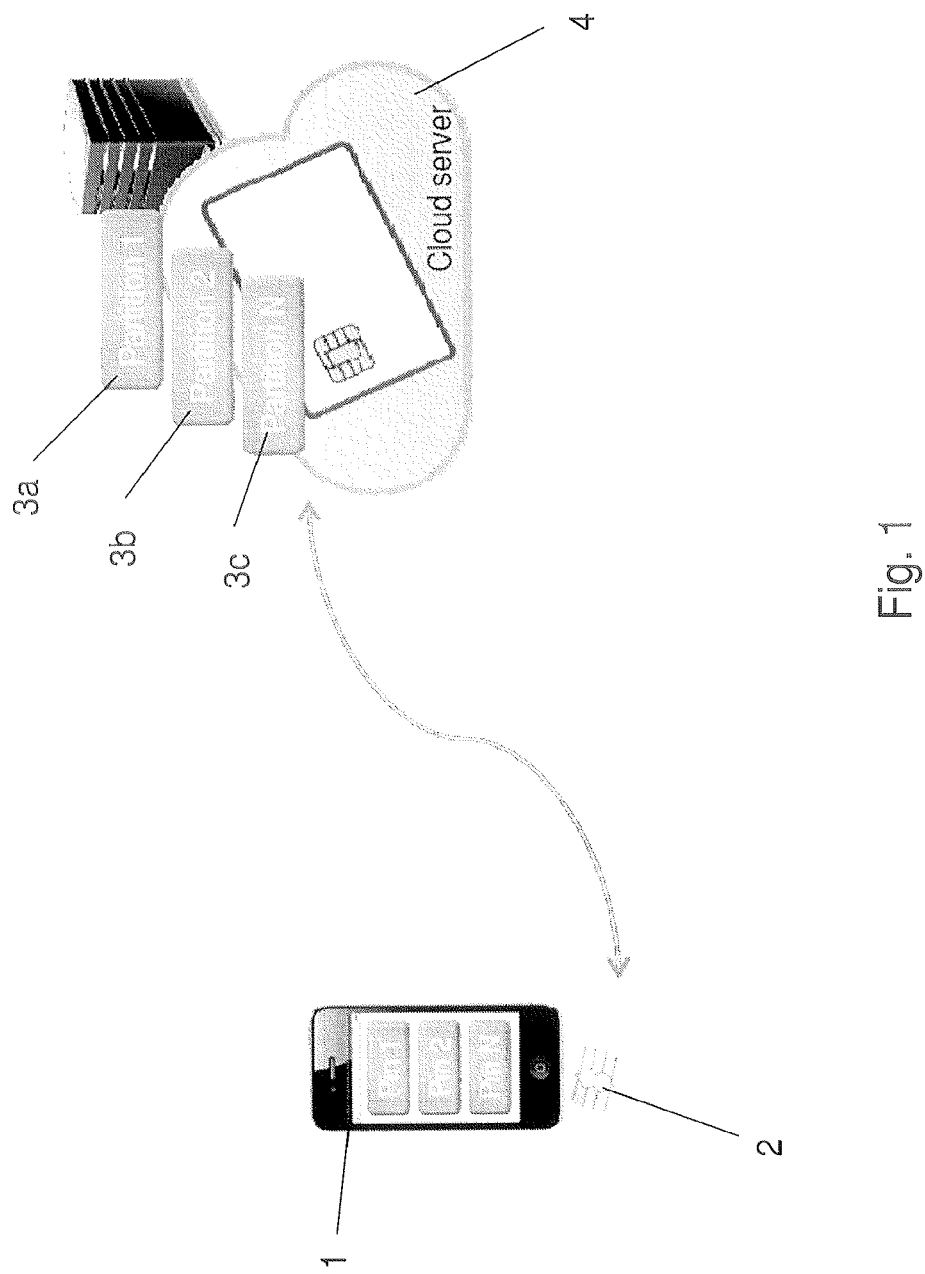
FIG. 1 is a schematic diagram of a system comprising a mobile telephone and its corresponding cloud-based remote storage.

As shown in FIG. 1, a mobile telephone 1 comprises a SIM 2 and has access to data-storage partitions 3a, 3b, 3c in a cloud server 4. The SIM 2 contains software for accessing remote data partitions.

The mobile telephone 1 can only access a partition 3a, 3b, or 3c upon entering the correct passcode or PIN for that partition 3a, 3b, or 3c. Each partition has its own passcode or PIN which is set by the user.

In addition to the correct passcode or PIN, an identification code from the correct SIM 2 must also be provided for access to the data in a partition 3a, 3b or 3c to be granted.

When a user wishes to access a particular partition 3a, 3b, or 3c, they enter the passcode or PIN for that partition 3a, 3b, or 3c by typing on the keypad or touch-sensitive screen of the mobile telephone 1. The entered passcode or PIN is then passed to the SIM 2 where it is passed an encryption algorithm combining it with the SIM identification code to create a hash.

The hash is then passed to a processor at the cloud server 4 where it is decrypted to extract the passcode or PIN and identify which partition 3a, 3b or 3c the user is seeking to access. Then, if the hash corresponds to a hash already stored in memory at the cloud server 4 for that partition 3a, 3b or 3c, access to the requested partition 3a, 3b or 3c is allowed and data stored in that partition 3a, 3b or 3c can be accessed via the mobile telephone 1.

In some embodiments, a third form of authentication such as something the user "has", e.g. a form of genetic or biometric ID (e.g. a finger-print or iris scan) is also required in order for access to the partition 3a, 3b or 3c to be granted. In other embodiments, this is required instead of a passcode or PIN for the partition 3a, 3b or 3c.

The content or data stored in each partition 3a, 3b and 3c is encrypted, so that when access to a particular partition 3a, 3b or 3c is allowed, the content of that partition 3a, 3b or 3c is decrypted using the passcode or PIN for the partition 3a, 3b or 3c and SIM identification code, or a key stored in the SIM 2.

When access to a partition 3a, 3b or 3c has been granted and its content decrypted, the content can be viewed on a screen of the mobile telephone 1.

Figure 2:
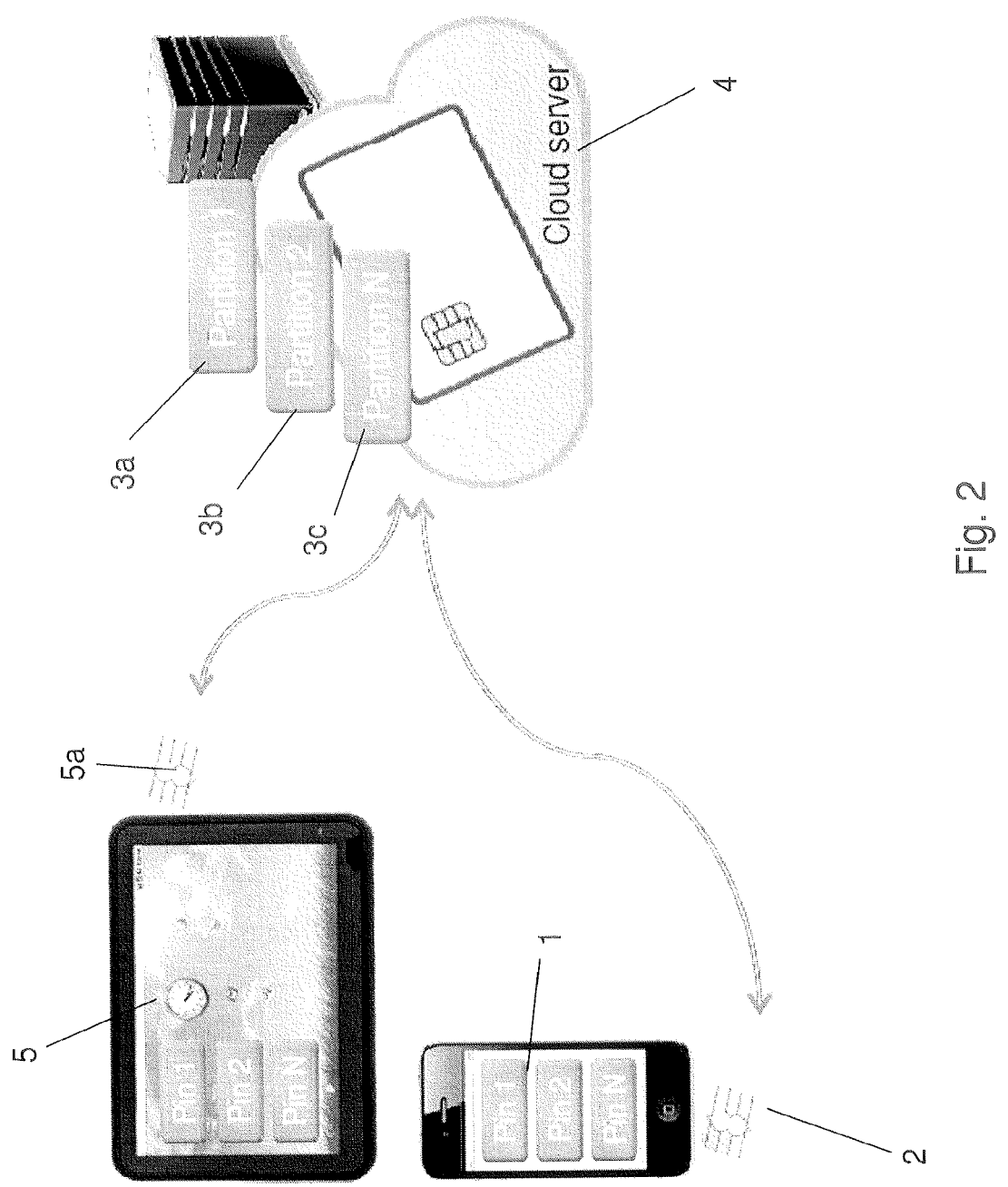
FIG. 2 is a schematic diagram of a system comprising a mobile telephone and a tablet device and their corresponding cloud-based remote storage.

The mobile telephone 1 is the administrator device which controls the partitions 3a, 3b and 3c. However, a user (or other users) may have further devices from which they would like to access the partitions 3a, 3b and 3c. For example, as shown in FIG. 2, a user has a tablet device 5 with a SIM 5a from which the user would like to access the partitions 3a, 3b and 3c. The SIM 5a of the tablet device 5 is also registered with the partitions 3a, 3b or 3c so that on entry of the correct PIN or passcode and/or the correct genetic or biometric information at the tablet device 5, the table device 5 is granted access to the partition 3a, 3b or 3c. The way in which access to the partition 3a, 3b or 3c is granted is controlled in the same way as described above for the mobile telephone 1.

Figure 3:
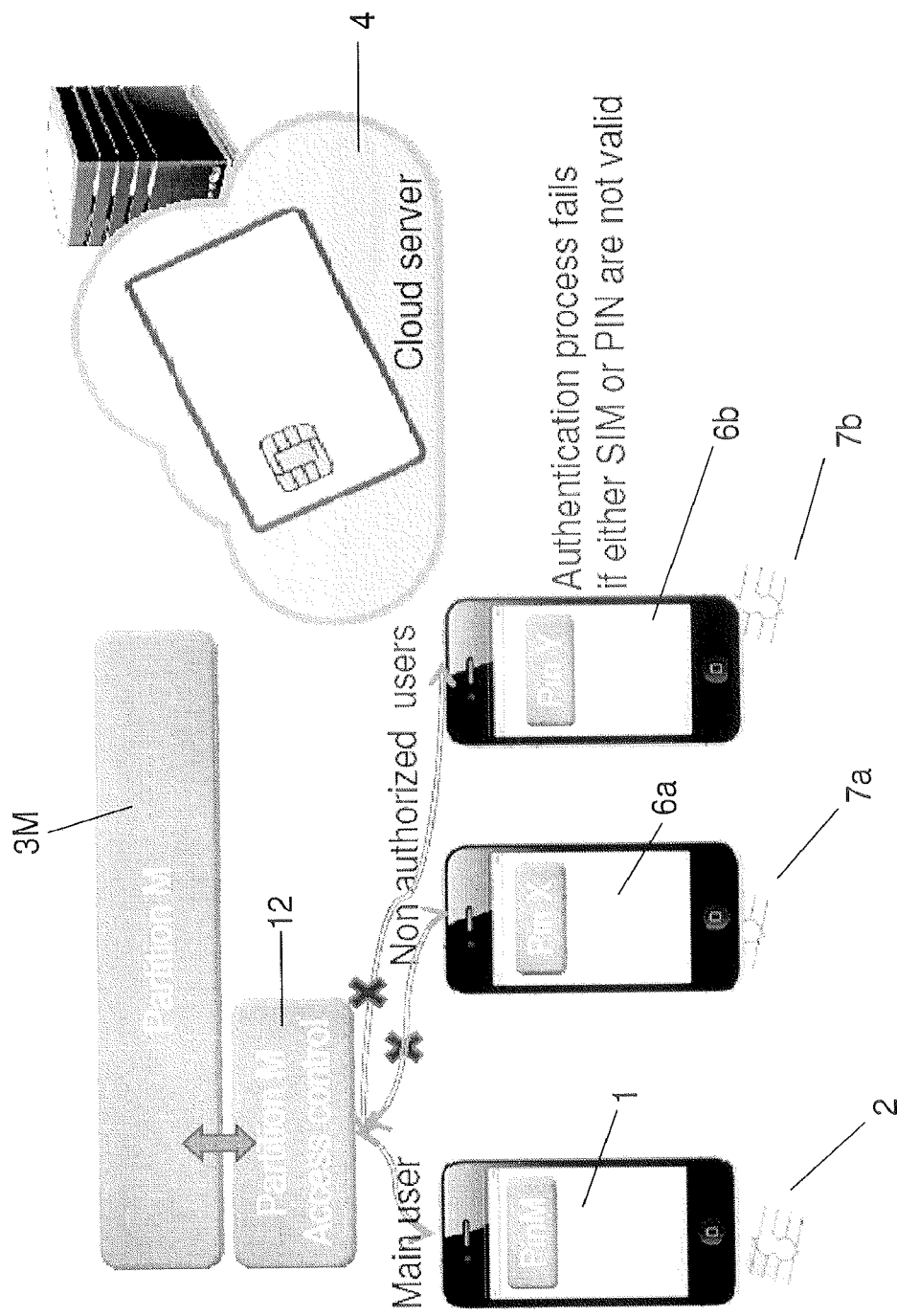
FIG. 3 is a schematic diagram illustrating authorised and non-authorised access attempts to remotely stored data from mobile telephones.

FIG. 3 illustrates the case where non-authorised users seek to access a partition 3M stored at a cloud server 4. A non-authorised user has a mobile telephone 6a or 6b with SIM 7a or 7b, respectively. Access to the partition is controlled by the access controller 12. The access controller 12 is located in the cloud. In some embodiments, the access controller 12 is part of a mobile telephone provider system.

The non-authorised user enters a PIN or passcode in their mobile telephone 6a or 6b but access to the partition 3M is not granted because the PIN or passcode is incorrect and/or the SIM identification code is incorrect. The access controller 12 does not allow the mobile telephones 6a and 6b to access the partition 3M. However, it allows the main mobile telephone 1 to access the partition 3M.

Figure 4:
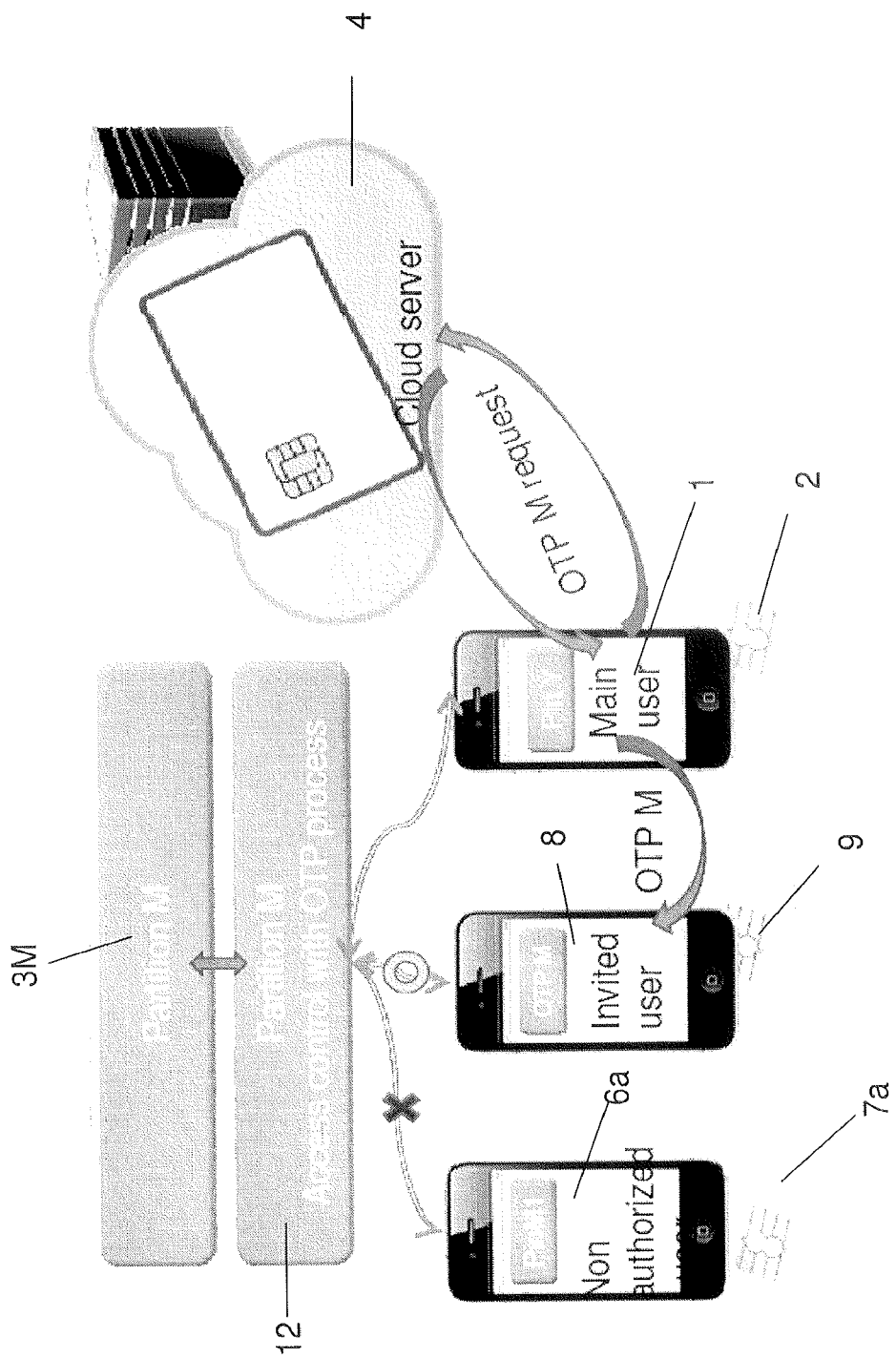
FIG. 4 is a schematic diagram illustrating authorised, invited and non-authorised access attempts to remotely stored data from mobile telephones.

FIG. 4 illustrates the case where a non-authorised user and an invited user seek to access a partition 3M stored at a cloud server 4.

In this case, as with the case of FIG. 3, the access controller 12 denies access to partition 3M to the mobile telephone 6a of the non-authorised user.

In order for access to be granted to the invited user, the main user sends a request from their mobile telephone 1 to the cloud server 4 for a one-time-password (OTP) in relation to access to partition 3M. The cloud server 4 verifies that the identification code of the SIM 2 of the mobile telephone 1 is registered with the partition 3M, and that the user associated with that SIM 2 is allowed to invite other users to access partition 3M, and, if so, sends a OTP back to the mobile telephone 1. The main user then sends this OTP on to the mobile telephone 8 of the invited user. The invited user then sends a request to the access controller 12 to access the partition M and enters the OTP. The access controller 12 verifies the OTP and if the OTP is correct then the invited user is granted access to the partition 3M.

In an alternative embodiment (not shown), the main user generates an OTP in their mobile telephone 1 and then sends that OTP to the cloud server 4 for registration against the partition 3M. The OTP is also sent from the mobile telephone 1 to the mobile telephone 8 of the invited user. Once the OTP is registered against the partition 3M the invited user can access the partition 3M by entering the OTP as described above.

In some embodiments, the OTP is only valid for a certain period of time, such as 5 minutes.

In some embodiments, access to the partition 3M is only granted to the invited user for a certain period of time such as 1-24 hours.

In some embodiments, the OTP is only valid for a single access attempt to partition 3M. Once it has been used once then it can no longer be used again to access 3M. A further OTP must be requested by the main user for subsequent access to the partition 3M.

In some embodiments, the main user is able to monitor and/or block access to the partition 3M to the invited user if desired.

Figure 5:
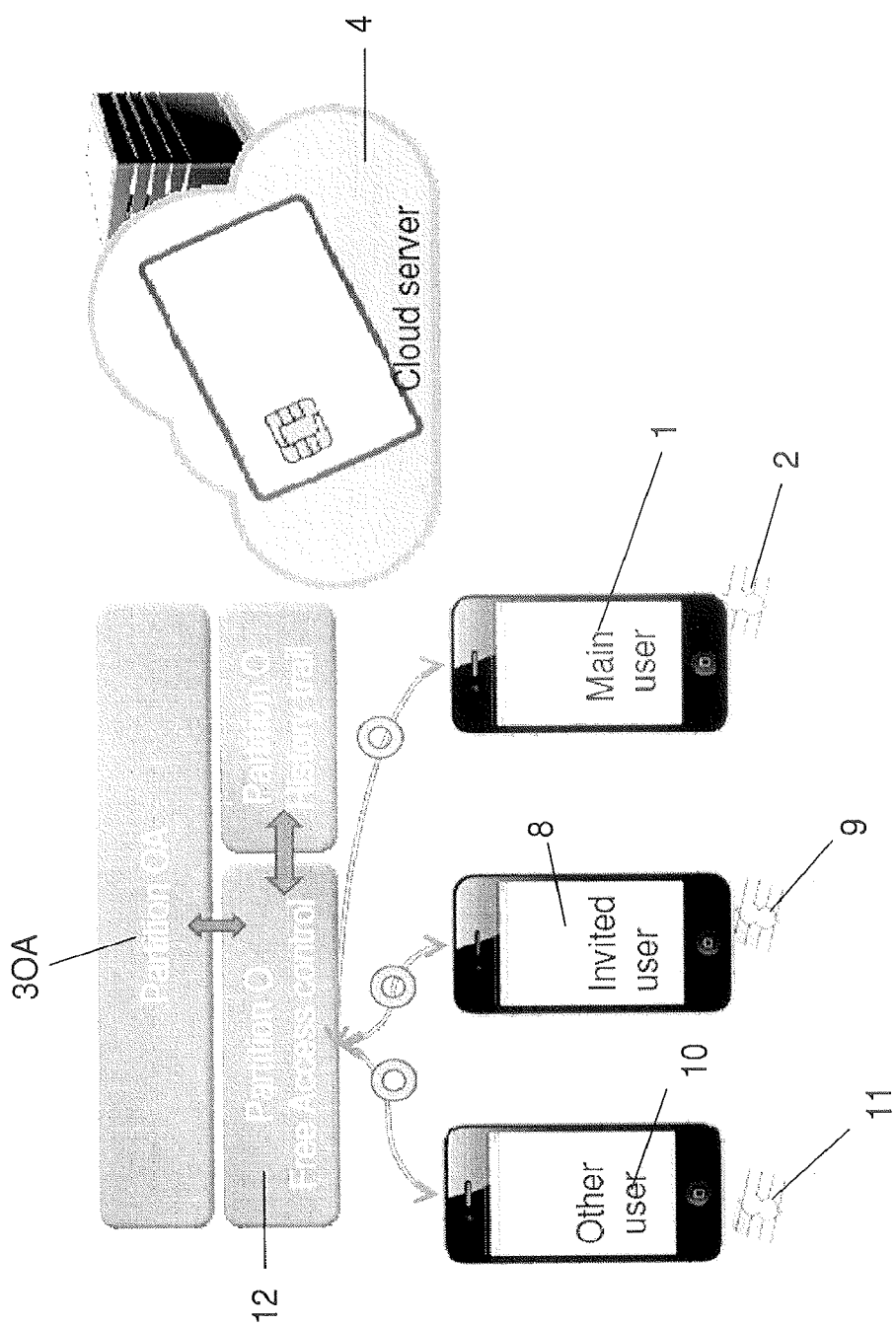
FIG. 5 is a schematic diagram illustrating authorised, invited and non-authorised access attempts to remotely stored data from mobile telephones with access monitoring.

When a partition is set up at a cloud server 4, it may be set as an "open" partition such that anyone may access the data stored there. FIG. 5 shows an example of such an open partition 30A. In some embodiments some users only have "read" access to the data stored in the partition 30A whereas other users such as invited and/or main users have both "read" and "write" access to the data stored there.

In the case shown in FIG. 5, since partition 30A is an open partition which is accessed from a main mobile telephone 1, a mobile telephone 8 of an invited user and a mobile telephone 10 of another (non-invited) user, access to the partition 30A is monitored and recorded in memory 30A-h. The data recorded consists of an identification code associated with the device accessing the partition 30A and/or the time of the access attempt for example. Other data may also be recorded. This can allow a main user to monitor access to the partition 30A and, based on the recorded data and, if desired, block access to the partition 30A to a particular user.

Figure 6:
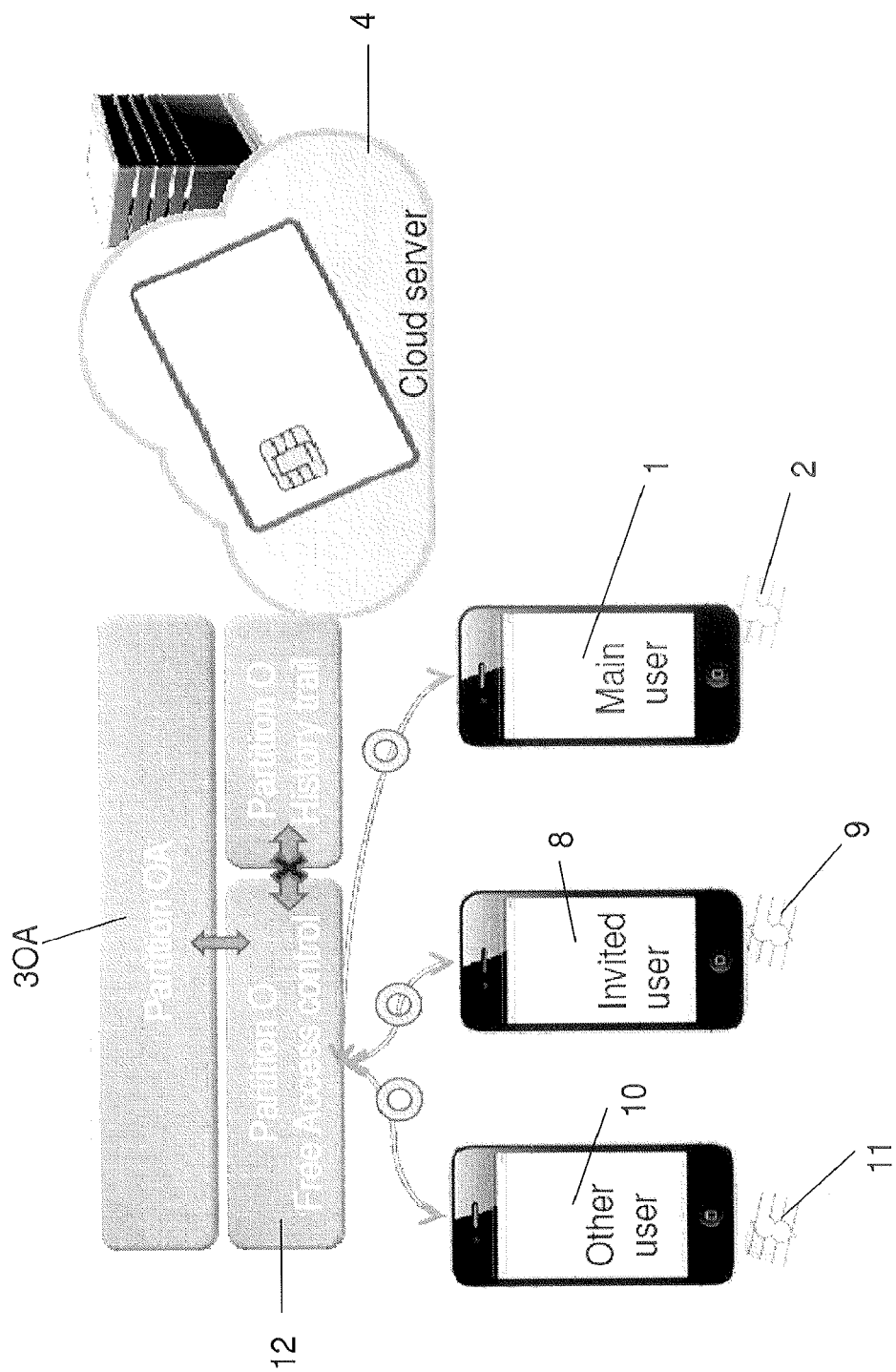
FIG. 6 is a schematic diagram illustrating authorised, invited and non-authorised access attempts to remotely stored data from mobile telephones without access monitoring.

FIG. 6 is similar to FIG. 5 except that there is no monitoring of access to the partition 30A.

In order to register a device so that it can access a particular partition, the device must have installed on it appropriate software (e.g. an application) for accessing the partitions. This is, for example, stored in a secure element or memory card associated with the device.

Figure 7:
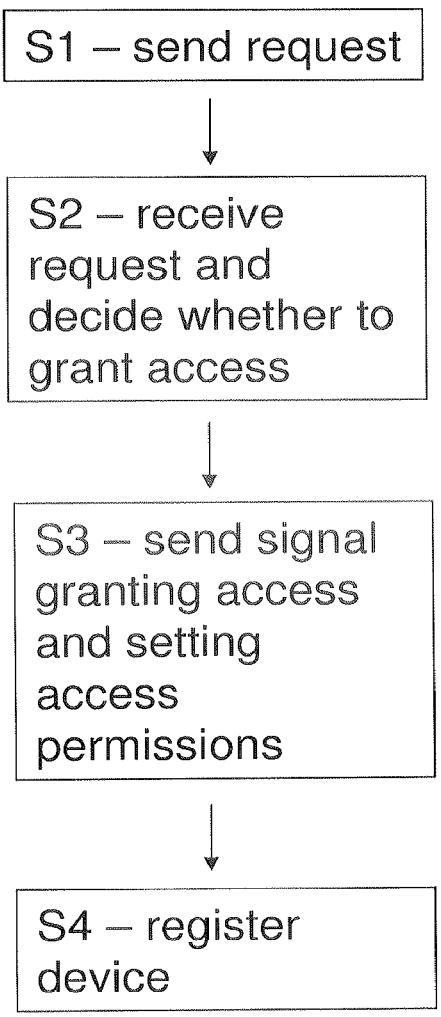
FIG. 7 is a flow diagram illustrating the process for registering a device so that it can access a partition.

In order to register a device so that it can access a particular partition, the following process, as illustrated in FIG. 7, is then performed:

The user of the device to be registered sends a request to gain access to a partition or partitions from the device to an administrator device, via the partition access controller S1. The request is in the form of an email or SMS, for example. The request includes a two-factor authenticated code. This code is created from an identification code of a secure element or memory card associated with the device and either a passcode or PIN, or data representing something inherent to the user. This allows for an auditable trail of which devices have requested access to a partition.

When the partition administrator receives the request at the administrator device, the administrator decides whether to grant access to the partition(s) or deny access S2. The administrator can also set access permissions for the user such as read only or the ability to edit/delete/add additional content to the partition.

If the owner has decided to allow access to a partition to a user then they will send a signal from the administrator device to the access controller confirming their agreement for the device to be registered against the partition so that the device can access the partition (with the access partitions specified by the administrator) S3.

The access controller then registers the device (i.e. the identification code associated with its memory card or secure element) against the partition(s) with the access partitions specified S4.

When the user opens or logs into the application for accessing the partitions, they can access the partition(s) by entering the PIN or passcode or data representing something inherent to the user that corresponds to that partition. Different devices can have a different PIN or passcode or data representing something inherent to the user for accessing a given partition.

The user of the device to be registered can be the same person as the administrator or a different person.

The administrator of the partition can also invite someone to access a partition and send an invitation to them to do so. As with the above case, the invited user must have installed on their device appropriate software (e.g. an application) for accessing the partitions. The invitation is sent via the access controller. The invitation can be in the form a message such as an email or SMS message and/or it could be sent and viewable via a messaging system within the partition access application. When the user opens or logs into this application, they can see that an invitation has been received to access a particular partition. The user can then access the partition.

The invitation can include a OTP (one-time-password) which the user can enter in a web browser in order to access the partition via the web browser (as opposed to via the partition access application)

In order for any user to open or log in to the partition access application, they must enter their PIN or passcode for the application, or biometric information, and this is checked together with the identification code for the secure element or memory card associated with their device.

Figure 8:
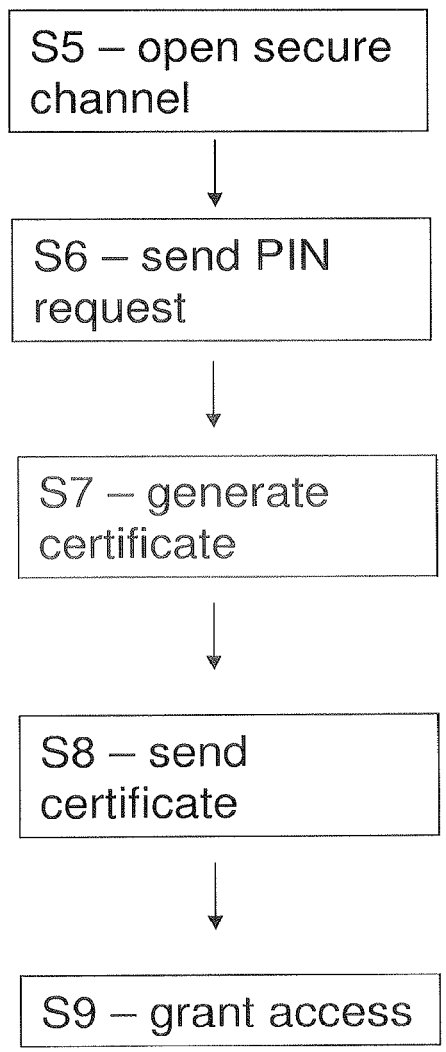
FIG. 8 is a flow diagram illustrating an authentication process.

FIG. 8 is a flow diagram illustrating an embodiment of the authentication or verification process of a device. A user of the device opens the partition access application on their device and logs in. This automatically causes a signal to be sent to the partition access controller to say that the application has been opened. A machine-machine handshake is then performed, which includes the access controller checking that the identification code of the SIM (or other secure element or memory card) is registered, as well as the device checking an ID certificate of the access controller. This is performed by a "challenge" being sent from the access controller to the device, which then replies with and "answer". If this the checks are confirmed as being correct then a secure channel is opened between the device and the access controller S5.

The access controller then sends a request to the device, via the secure channel, for the user to enter their PIN or passcode for the partition they wish to access S6.

The user enters the PIN or passcode and the SIM (or other secure element or memory card associated with the device) checks that this is correct. If so, then the SIM (or other secure element or memory card) then generates a certificate based on the entered PIN or passcode S7.

In an alternative embodiment, instead of or in addition to the PIN or passcode, the user could be requested to, and then enter data representing something inherent to them, such as biometric data. The certificate would then be based on this data.

The generated certificate is then sent from the device to the access controller via the secure channel S8.

The access controller checks the certificate and, if it is registered against the requested partition, permission for the device to access the requested partition is granted and the device accesses the requested partition S9.

Figure 9:
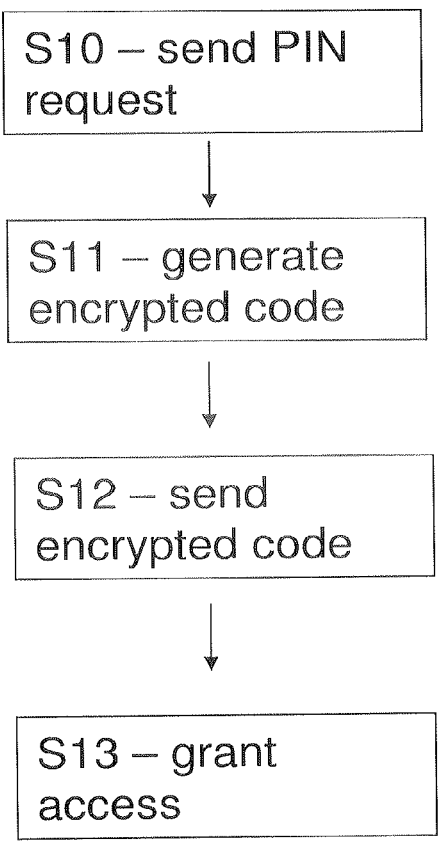
FIG. 9 is a flow diagram illustrating an access code encryption process.

FIG. 9 is a flow diagram illustrating how an access code for an invited user to access a partition can be encrypted.

When an administrator wishes to provide an access code for a partition so that another user can access that partition (or so that the administrator can access the partition) from an unregistered device, a PIN request is sent from the access controller to the administrator device S10.

The administrator enters a PIN into the administrator device for the partition to which they would like to grant access, and the SIM of the administrator device (or other secure element or memory card associated with the device) then generates an encrypted code S11.

The encrypted code is then sent from the administrator device to the access controller via a secure channel S12.

The access controller then registers the encrypted code against the partition so that, if subsequently entered, access to that partition can be granted S13.

The access controller also sends the encrypted code to the invited device via a secure channel so that the invited device can access the partition.

In some embodiments the encrypted code is only valid for a single access and/or for a limited period of time. In other embodiments, the encrypted code may be valid indefinitely or does not expire.

In some embodiments, the partition access application is an API that is accessed as an Apache Cordova Javascript bridge. It is stored in the secure element or memory card and holds the following keys and PINs which are generated onboard (i.e. in the secure element or memory card):
- One RSA 2048 public/private key pair for the application
- One variable size PIN per partition to authenticate the user
- One 3DES-2 key per partition used for encrypted files The server or access controller holds two 3DES-2 master keys which can be diversified per device. These two keys are sent to the application following its creation, protected by a Secure Channel of the application Security Domain:
- The Initialization Key used to encrypt Public Key data returned by a Secure Element application in order to verify the authenticity of the application
- The Time Key used to provide a Secure Time source when generating a remote access code for a partition The Secure Time is a nonce given by the target device followed by the UNIX timestamp, 3DES-2 CBC encrypted by the Time Key.

According to the size of the target file, the partition key can be used to encrypt the file data directly, or a key handled by the handset to encrypt the file data.

The following describes a process which is followed when a user, Sarah, wants to share her partition data with another person, Robert.

Preconditions

Robert's device Public Key is registered with the authentication server (access controller), identified by a public identifier (such as Robert e-mail)
Sarah logs on to the partition to share
Sarah requests to share this partition with Robert
The server obtains the Secure Time Nonce for Sarah's application
The server sends Robert's Public Key and the current Secure Time, both encrypted for Sarah's application
The handset application obtains the sharing blob, and displays the sharing code to Sarah
The sharing blob is sent to the server and associated to Robert public identity
Sarah provides the sharing code to Robert (by e-mail, SMS, phone, voice . . . )
Robert sees that a new partition is shared to him by connecting to the server, and enters the sharing code provided by Sarah
The server obtains the Secure Time Nonce for Robert's application
The server sends the sharing blob and the current Secure Time encrypted for Sarah's application
The partition access key is recovered by Robert's Secure Element or Robert's application The following low level management APIs are defined:
isSecureElementPresent( )
    returns true if the Secure Element is present
getSecureElementID( )
    returns the unique ID of the Secure Element (extracted from
    the CPLC) as an HexString
getCCSEApplicationVersion( )
    returns the version of the CCPartition application as a string,
    or "undefined" if the application is not installed The following application update and initialization APIs are defined:
getKeysetCounter(aid, keysetVersion) (HexString, Number)
    returns the counter for the given Security Domain AID and keyset version
executeAPDUScript(apdus) (Array of HexString)
    execute an APDU script on the Secure Element, expecting a 90 00 Status Word for each APDU.

The following high level management APIs are defined:
getPublicKey( )
    returns the Public Key of the application, 3DES-2 CBC encrypted with the Initialization Key
createPartition(shortName, pin) (String, HexString)
    create a partition given a short name and a PIN, returns a one byte partition ID.
listPartitions( )
    returns an Array of [id, shortName] identifying the partitions created on the Secure Element
deletePartition(id) (Number)
    deletes a partition. The user must be logged on to the partition to delete, or the PIN of the partition must be blocked The following Usage APIs are defined:
loginPartition(id, pin) (Number, HexString)
    logins to a given partition
logoutPartition( )
    logout from the currently logged in partition encryptData(data, iv) (HexString, HexString)
    encrypts data using a 3DES-2 CBC encryption with the given
    IV and the currently selected partition key
decryptData(data, iv) (HexString, HexString)
    decrypts data using a 3DES-2 CBC encryption with the given IV and the currently selected partition key
getSecureTimeNonce( )
    returns an 8 bytes nonce to be passed to the server to provide the next Secure Time
getSharingCode(secureTime, encryptedPublicKey, validityMinutes) (HexString, HexString, Number)
    get a sharing code for another device. Returns an Array of two elements, a blob to be passed to the remote device and the generated 8 digits code, for example. The blob contains the timestamp of the end of the validity period of the sharing code concatenated with the sharing code concatenated with the partition key and encrypted by the remote device Public Key using PKCS #1 padding. In other embodiments, the code can be of any length and/or cane be alpha numeric.

useSharingCode(secureTime, blob, accessCode)
(HexString, HexString, String)
use a sharing code obtained from a remote device. If the blob, access code and time validity are approved by the application, files can be encrypted and decrypted with the extracted partition key using the partition Id 0xff until the user logs out or the Secure Element is powered off.

Figure 10:
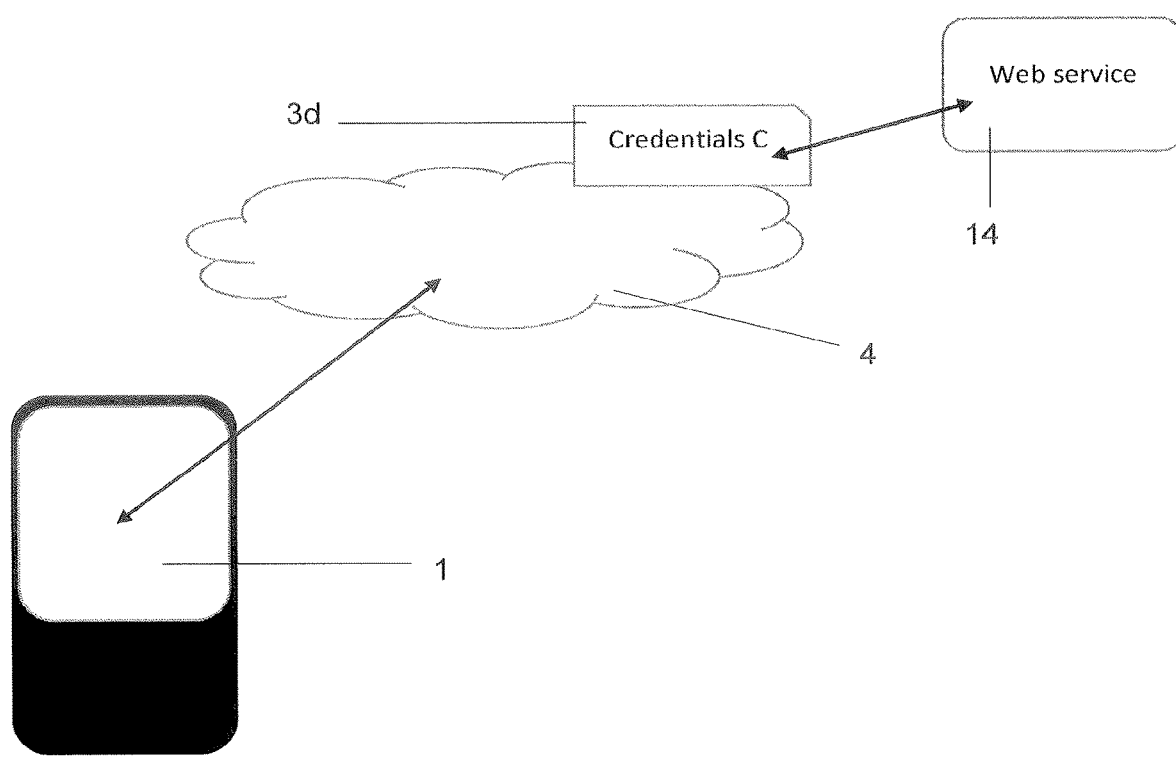
FIG. 10 is a schematic diagram of a system comprising a mobile device, the cloud and a third party web service.

FIG. 10 is a schematic diagram of a system comprising a mobile device 1, the cloud 4 and a third party web service 14. The mobile device 1 is configured to run an application operable to allow access to the web service 14, via a cloud partition 3d. When the application is launched, the user is prompted to enter a PIN code. If the correct PIN code is provided, the cloud partition 3d is opened. Once the partition is open, the credentials C to access web service 14 are transferred from the partition 3d, allowing access to the web service 14.

Figure 11:
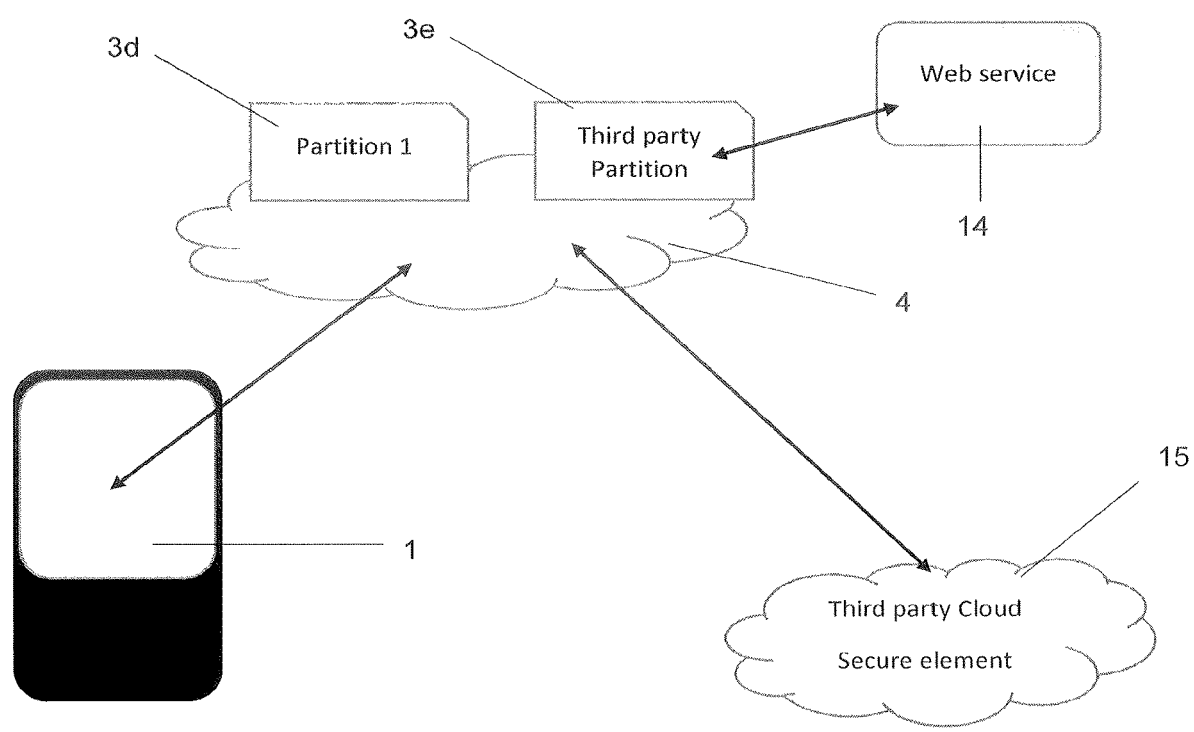
FIG. 11 is a schematic diagram of a system comprising a mobile device, the cloud and a third party web service requiring high security.

FIG. 11 is a schematic diagram of a system similar to FIG. 10, but illustrates the case where a second authentication is carried out between the device and a third party partition 3e. As in FIG. 10, the mobile device 1 is configured to run an application operable to allow access to the web service 14, via a cloud partition 3d. When the application is launched, the user is prompted to enter a PIN code. If the correct PIN code is provided, the cloud partition 3d and third party partition 3e are opened. The third party partition launches a new process including the following steps: asking for new PIN code from the device, and, if the correct PIN is received, launching a mutual authentication process between the device secure element and the third party cloud secure element. The credentials C to access the web service 14 are transferred from the secure element of the device to the third party partition 3e, thereby allowing access to the web service 14.

That which is claimed is:

1. A method of accessing data at a device, wherein the data is stored in a plurality of partitions associated with the device, the partitions being stored in the device, remotely from the device or in removable storage, the method comprising the following operations:
   (i) determining a selected partition to be accessed from the plurality of partitions, based at least partly on location information derived from a signal read by the device from a signal emitting device;
   (ii) sending a request from the device to access the data, the request including information specifying the selected partition to be accessed and an identification code of a secure element associated with the device;
   (iii) verifying, based at least partly on the identification code, whether access to the data is to be allowed or denied;
   (iv) allowing the device access to the data accordingly; and
   (v) accessing the data in the selected partition using the device.

2. The method of claim 1, wherein the data is stored in cloud-based storage.

3. The method of claim 1, wherein the request includes a passcode or PIN entered at the device and step (ii) also comprises verifying based at least partly on the passcode or PIN whether access to the data is to be allowed or denied.

4. The method of claim 1, wherein the request includes data inherent to a user of the device, and step (iii) also comprises verifying based at least partly on the data inherent to the user of the device whether access to the data is to be allowed or denied, and/or wherein the request includes data including a location, and step (iii) also comprises verifying based at least partly on the location whether access to the data is to be allowed or denied;

wherein the request includes data including a time, and step (iii) also comprises verifying based at least partly on the time whether access to the data is to be allowed or denied; and/or wherein the request includes data indicating that the user is part of a group, and step (iii) comprises verifying whether access to the data is to be allowed or denied based at least partly on whether another member of the group is accessing the data.

5. The method of claim 4, wherein the data inherent to the user of the device comprises data representing genetic and/or biometric information about the user.

6. The method of claim 1, wherein the a secure element or memory card is a SIM, virtual SIM, SIM software, TPM, SE, TEE, Micro SD, Memory card, USB key or Smartcard associated with the device.

7. The method of claim 1, wherein the data is stored in a partition associated with the device, and the request comprises data specifying the partition, and wherein the data facilitates connection to a third party service.

8. The method of claim 7, wherein the data specifying the partition comprises one or more of:
   a PIN or passcode; and
   data inherent to a user of the device.

9. The method of claim 8, wherein the data inherent to the user of the device comprises data representing genetic and/or biometric information about the user.

10. The method of claim 1, wherein the device is a telephone, a tablet, a laptop computer, a desktop computer, a TV, a set top box, a camera, a car, a game console, glasses, a watch, Chromecast, a smart meter or any other device which is capable of sending and receiving data to remote devices.

11. The method of claim 1, the method comprising, prior to steps (i)-(iv):
   registering an identification code of a secure element or memory card with the data.

12. The method of claim 11, wherein identification codes of more than one secure element or memory card are associated with the data.

13. A system comprising:
   a device; and
   at least one hardware processor configured to:
   control access from the device to data stored in a partition associated with the device, and stored in the device, remotely from the device or in removable storage;
   identify, based at least partly on location information derived from a signal read from a signal emitting device, the partition to be accessed;
   send a request to access the data to the data access controller, the request including the location information and an identification code of a secure element or memory card associated with the device;
   verify, based at least partly on the identification code and on the location information, whether access to the data is to be allowed or denied, and
   allow the device access to the data accordingly,
wherein at least one processor of the device is configured to access the data in the secure element or the memory card.

14. A method of accessing a cloud-based or web-based third party service from a device, the method comprising the following steps:

(i) sending a request from the device to a cloud-based partition associated with the device, the partition including data for facilitating connection to the third party service, the request including an identification code of a secure element or memory card associated with the device;

(ii) verifying, based at least partly on the identification code, whether access to the partition is to be allowed or denied;

(iii) allowing the device access to the partition accordingly;

and, after access to the partition is allowed:

(iv) transmitting credentials to the third party service; and (v) accessing the data in the partition using the device, wherein location information required to identify and/or access the partition is read from a signal emitting device.

15. The method of claim 14, wherein the signal emitting device is a Bluetooth, BLE, wifi, zigbee, NFC, GPS, or ISO14443 device, or makes use of any other form of contactless communication.

16. The method of claim 14 further comprising the steps of:

(v) executing a mutual authentication process between the device and the remote or removable storage;

(vi) creating a secure channel between the device and the remote or removable storage; and (vii) transmitting data between the device and the remote or removable storage.

17. The method of claim 16 wherein the authentication comprises two or more factors, the factors being chosen from the following list:

an identification code of a smart object (a memory card or secure element) associated with the device;

a passcode or PIN;

genetic or biometric identification data;

a location;

a time; or whether another member or a group to which a user of the device belongs is accessing the data.

18. The method of claim 16 wherein the authentication comprises two factors, the factors being an identification code of the secure element associated with the device; and a passcode or PIN.

* * * * *